(12) United States Patent
Kuroki et al.

(10) Patent No.: US 7,749,635 B2
(45) Date of Patent: Jul. 6, 2010

(54) GASKET WITH SHEET-SHAPED MEMBER AND A GASKET MAINBODY MOUNTED TO A MOUNTING MEMBER

(75) Inventors: Yuichi Kuroki, Fujisawa (JP); Kazuhisa Senda, Fujisawa (JP); Yoshihiro Kurano, Fujisawa (JP); Tomohiro Inoue, Fujisawa (JP)

(73) Assignee: NOK Corporation, Minato-ku, Tokyo (JP)

( * ) Notice: Subject to any disclaimer, the term of this patent is extended or adjusted under 35 U.S.C. 154(b) by 753 days.

(21) Appl. No.: 10/470,278

(22) PCT Filed: Feb. 13, 2002

(86) PCT No.: PCT/JP02/01196

§ 371 (c)(1),
(2), (4) Date: Aug. 7, 2003

(87) PCT Pub. No.: WO02/073072

PCT Pub. Date: Sep. 19, 2002

(65) Prior Publication Data

US 2004/0075224 A1    Apr. 22, 2004

(30) Foreign Application Priority Data

| Mar. 9, 2001 | (JP) | 2001-066016 |
| Mar. 23, 2001 | (JP) | 2001-083968 |
| Jun. 6, 2001 | (JP) | 2001-170564 |
| Sep. 14, 2001 | (JP) | 2001-279117 |

(51) Int. Cl.
*H01M 2/08* (2006.01)
*H01M 8/02* (2006.01)

(52) U.S. Cl. ............................ 429/36; 429/34; 429/35; 277/650

(58) Field of Classification Search ................... 429/36
See application file for complete search history.

(56) References Cited

U.S. PATENT DOCUMENTS

| 3,743,544 A | * | 7/1973 | Stewart, Jr. .................. 429/26 |
| 5,428,895 A | * | 7/1995 | Sihon .......................... 29/888.3 |
| 6,159,628 A | * | 12/2000 | Grasso et al. .................. 429/35 |

(Continued)

FOREIGN PATENT DOCUMENTS

JP    10-173364    6/1998

(Continued)

*Primary Examiner*—Jonathan Crepeau
*Assistant Examiner*—Tony Chuo
(74) *Attorney, Agent, or Firm*—Jacobson Holman PLLC

(57) ABSTRACT

In order to provide a gasket which has a good handling property as a gasket used for a fuel battery or a gasket for an hard disc drive, can be easily integrated with the other end mounting member even in the case that the other end mounting member such as a separator or the like is a material having low strength or a thin plate, and has good mounting workability, a gasket is having a sheet-shaped gasket mounting member provided with a sticking function on one face, and a gasket main body made of a rubber-type elastic member integrated with the sheet-shaped gasket mounting member, and the gasket is mounted to the other end mounting member on the basis of the sticking function of the sheet-shaped gasket mounting member.

2 Claims, 26 Drawing Sheets

U.S. PATENT DOCUMENTS

| | | | | |
|---|---|---|---|---|
| 6,190,751 | B1 * | 2/2001 | Sylvester | 428/66.4 |
| 6,316,139 | B1 * | 11/2001 | Uchida et al. | 429/36 |
| 2002/0011711 | A1 * | 1/2002 | Senda et al. | 277/626 |

FOREIGN PATENT DOCUMENTS

| | | | |
|---|---|---|---|
| JP | 11-125335 | * | 5/1999 |
| JP | 2000-48835 A | | 2/2000 |
| JP | 2000-311468 | | 11/2000 |
| JP | 2001-057220 | * | 2/2001 |
| WO | WO 00/64995 | * | 2/2000 |

* cited by examiner

FIG. 1

| | | ADHESIVE CONDITION | | |
|---|---|---|---|---|
| | | 120°C 1MPa 1min | 80°C 1MPa 1min | 60°C 1MPa 1min |
| SEPARATOR | SUS PLATE | ○ | — | — |
| | CARBON PLATE | ○ | — | — |
| MEA | | ○ | ○ | ○ |

GASKET WITH SHEET-SHAPED MEMBER AND A GASKET MAINBODY MOUNTED TO A MOUNTING MEMBER

This is a nationalization of PCT/JP02/01196 filed Feb. 13, 2002 and published in Japanese.

TECHNICAL FIELD

The present invention relates to a gasket corresponding to one of sealing apparatuses, and more particular, to a gasket suitable for being used as a gasket for a fuel battery, a gasket for a top cover in a hard disc drive (HDD) or the like.

BACKGROUND OF THE INVENTION

For example, as a fuel battery gasket used in a fuel battery cell, there has been conventionally known a gasket of a gasket elementary substance type, a separator integral type or a reaction electrode portion (MEA) integral type, and each is attached to a predetermined position of a cell, thereby sealing a sealed fluid such as a fuel gas, an oxidizer gas, a refrigerant or the like.

However, these conventional arts have the following disadvantages.

That is, first, in the case that the gasket is used in the fuel battery cell, it is necessary to seal an outer periphery of a reaction surface completely. However, since a face of a board to be sealed is wide, a handling property is not so good in the case of the gasket of the elementary substance type. Further, in the case that the cells are laminated so as to assembly a fuel battery stack, a handling property, and consequently assembling workability is not so good. This is because the gasket tends to be deformed at a time of being handled due to a small cross sectional shape and thinness of the gasket in comparison with a size of the gasket.

Further, in the case that the gasket is of the integral type, there can be considered a printing method in accordance with an integral forming, and a post-bonding method. The printing method in accordance with the integral forming is structured such as to integrally form a gasket (a gasket main body) 101 directly on the other end mounting member 102 such as a separator, a reaction electrode portion or the like as shown in FIG. 33, and the post-bonding method is structured such as to mount the gasket (the gasket main body) 101 previously formed in a product shape independently to the other end mounting member 102 by using an adhesive agent 103 as shown in FIG. 34. In these cases, the assembling workability mentioned above can be improved, however, there is a possibility that the separator, the reaction electrode portion or the like is injured due to a pressure, a temperature or the like at a time of integrally forming, and in the case of the post-bonding, the handling property at a time of the bonding work is not so good, and it is hard to stably apply the adhesive agent.

Further, in the case that a material of the separator is a low strength material such as a carbon or the like, it is necessary to employ a forming technique under a low pressure so as to prevent the separator from being cracked due to a mold clamping force, a molding pressure or the like at a time of integrally forming the gasket. Further, since it is impossible to strongly press the separator by the mold, a lot of molding burrs are generated.

Further, since the structure is made such that one stack is formed by laminating a plurality of cells, it is necessary to make the parts constituting the cells thin with taking space saving into consideration, and it is necessary to make the separator thin for that purpose. In this case, in order to achieve the thinness by the integral forming, there is a limit in view of strength of the separator.

The present invention is made by taking the points mentioned above into consideration, and an object of the present invention is to provide a gasket which has a good handling property as a gasket used as a gasket for a fuel battery or a gasket for a HDD, can be easily integrated with the other end mounting member even in the case that the other end mounting member such as a separator or the like is a material having low strength or a thin plate, and-has good mounting workability.

DISCLOSURE OF THE INVENTION

In order to achieve the object mentioned above, in accordance with a first aspect of the present invention, there is provided a gasket comprising:

a sheet-shaped gasket mounting member provided with a sticking function on one face; and a gasket main body made of a rubber-type elastic material integrated with the sheet-shaped gasket mounting member, wherein the gasket is mounted to the other end mounting member on the basis of the sticking function of the sheet-shaped gasket mounting member.

Further, in accordance with a second aspect of the present invention, there is provided a gasket as recited in the first aspect mentioned above, wherein the gasket main body is integrally formed on another face of the sheet-shaped gasket mounting member by using an adhesive agent.

Still further, in accordance with a third aspect of the present invention, there is provided a gasket as recited in the first aspect mentioned above, wherein the gasket main body is made of an adhesive rubber, and is integrally formed on another face of the sheet-shaped gasket mounting member by using an adhesive property thereof.

Still further, in accordance with a fourth aspect of the present invention, there is provided a gasket as recited in the first aspect mentioned above, wherein the gasket main body is integrally formed on both faces of an end portion of the sheet-shaped gasket mounting member by using an adhesive agent.

Still further, in accordance with a fifth aspect of the present invention, there is provided a gasket as recited in the first aspect mentioned above, wherein the gasket main body is made of an adhesive rubber, and is integrally formed on both faces of an end portion of the sheet-shaped gasket mounting member by using an adhesive property thereof.

Still further, in accordance with a sixth aspect of the present invention, there is provided a gasket as recited in the fourth or fifth aspect mentioned above, wherein the adhesive agent is attached to one face of the sheet-shaped gasket mounting member, a mold releasing film is releasably attached to one face, and a portion for peeling the mold releasing film at a time of the mounting work is provided all around the periphery of the gasket main body.

Still further, in accordance with a seventh aspect of the present invention, there is provided a gasket as recited in the fourth or fifth aspect mentioned above, wherein the adhesive agent is attached to one face of the sheet-shaped gasket mounting member, a mold releasing film is releasably attached to one face, and a portion for peeling the mold releasing film at a time of the mounting work is provided in parts on the periphery of the gasket main body.

Still further, in accordance with an eighth aspect of the present invention, there is provided a gasket comprising:

a gasket main body made only of a rubber; and a sheet-shaped gasket mounting member provided in parts on a periphery of the gasket main body, wherein the gasket is mounted to the other end mounting member on the basis of a sticking function provided on one face of the sheet-shaped gasket mounting member.

Still further, in accordance with a ninth aspect of the present invention, there is provided a gasket as recited in the eighth aspect mentioned above, wherein a cross sectional shape of the gasket main body is an O-ring shape.

Still further, in accordance with a tenth aspect of the present invention, there is provided a gasket as recited in the eighth aspect mentioned above, wherein a cross sectional shape of the gasket main body is a lip shape.

Still further, in accordance with an eleventh aspect of the present invention, there is provided a gasket as recited in any one of the first to tenth aspect mentioned above, wherein the gasket main body is both-face gasket main body arranged on both faces of the other end mounting member, the sheet-shaped gasket mounting member is integrally formed in the gasket main body, and the gasket is bent to be double at a time of being mounted to the other end mounting member so as to be stuck to both faces of the other end mounting member.

Still further, in accordance with a twelfth aspect of the present invention, there is provided a gasket as recited in the eleventh aspect mentioned above, wherein the sheet-shaped gasket mounting member integrally has a portion stuck to one face side of the other end mounting member, a portion stuck to another face side, and a connection portion obtained by connecting the both portions, and is bent in the connection portion at a time of being mounted.

Still further, in accordance with a thirteenth aspect of the present invention, there is provided a gasket as recited in the twelfth aspect mentioned above, wherein the connection portion is provided with a bending position specifying portion such as a slit, a perforated line or the like for facilitating the bending of the connection portion.

Still further, in accordance with a fourteenth aspect of the present invention, there is provided a gasket as recited in any one of the first to thirteenth aspect mentioned above, wherein the other end mounting member is a separator for a fuel battery.

Still further, in accordance with a fifteenth aspect of the present invention, there is provided a gasket as recited in any one of the first to thirteenth aspect mentioned above, wherein the other end mounting member is a reaction electrode portion for a fuel battery, or an electrolyte membrane corresponding to a component part of the reaction electrode portion.

Still further, in accordance with a sixteenth aspect of the present invention, there is provided a gasket as recited in any one of the first to thirteenth aspect mentioned above, wherein the other end mounting member is a top cover for a HDD.

Still further, in accordance with a seventeenth aspect of the present invention, there is provided a gasket as recited in any one of the first to seventh aspect mentioned above, wherein the gasket is stuck to each of both faces of an electrolyte membrane for a fuel battery, and two or more seal lips are provided in each of the gaskets.

Still further, in accordance with an eighteenth aspect of the present invention, there is provided a gasket as recited in any one of the first to seventh aspect mentioned above, wherein the gasket is stuck to each of both faces of an electrolyte membrane for a fuel battery, and each of the gaskets is formed in a squeeze shape having no seal lip.

Still further, in accordance with a nineteenth aspect of the present invention, there is provided a gasket as recited in any one of the first to seventh aspect mentioned above, wherein the gasket is stuck to each of both faces of an electrolyte membrane for a fuel battery, one or more seal lips are provided in one gasket, and another gasket is formed in a squeeze shape having no seal lip.

Still further, in accordance with a twentieth aspect of the present invention, there is provided a gasket as recited in any one of the first to seventh aspect mentioned above, wherein the gasket is stuck to each of both faces of an electrolyte membrane for a fuel battery, one seal lip is provided in one gasket, and two or more seal lips are provided in another gasket.

In the gasket in accordance with the first aspect of the present invention provided with the structure mentioned above, since the integrated product constituted by the sheet-shaped gasket mounting member provided with the sticking function on one face and the gasket main body made of the rubber-like elastic material is formed, the former sheet-shaped gasket mounting member serves as an effect of reinforcing the latter gasket main body, so that it is possible to restrict the deformation of the whole of the gasket comparatively small at a time of handling. In order to secure this function, it is suitable that the sheet-shaped gasket mounting member employs a sheet-shaped member such as a resin film, a metal film, a woven fabric, a non woven fabric or the like, in which elongation is small in normal handling. Further, in the gasket having the structure mentioned above, since the gasket main body is integrated with the sheet-shaped gasket mounting member and is later bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is the material having a low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. Further, since the structure is made such that the gasket is mounted to the other end mounting member on the basis of the sticking function provided on one face of the sheet-shaped gasket mounting member, it is possible to mount the gasket to the other end mounting member in accordance with a simple work of only positioning and pressing the gasket. The other end mounting member is, for example, the separator for the fuel battery (the fourteenth aspect), the reaction electrode portion for the fuel battery or the electrolyte membrane as the component part thereof (the fifteenth aspect) or the top cover for the HDD (the sixteenth aspect) whereby it is possible to manufacture the gasket of the separator integrated type, the reaction electrode portion or electrolyte membrane integrated type or the top cover integrated type. In this case, the reaction electrode portion means a reaction electrode, an electrolyte membrane and a MEA integrated by the reaction electrode and the electrolyte membrane, and the reaction electrode portion and the like mean a cell component part of the fuel battery such as gas diffusion layer, a separator, a cooling plate and the like, in addition to the elements mentioned above. The electrolyte membrane may be sometimes called as an ion exchange membrane.

Further, in the gasket in accordance with the second aspect of the present invention provided with the structure mentioned above, since the gasket main body is integrally formed on another face of the sheet-shaped gasket mounting member by using the adhesive agent, the sheet-shaped gasket mounting member also serves as the effect of reinforcing the gasket main body, so that it is possible to restrict the deformation of the whole of the gasket comparatively small at a time of handling. Further, since the gasket main body is integrated with the sheet-shaped gasket mounting member and is later bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. In this case, in order to integrally form the gasket main body on another face of the sheet-shaped gasket mounting member by using the adhesive agent, there are a method of forming the gasket main body in a state of attaching the sheet-shaped gasket mounting member having the adhesive agent applied thereto to the molding die for forming the gasket main body, thereby integrating both the elements at the same time when the forming is finished, and a method of independently forming the gasket main body in the product shape and thereafter bonding the gasket main body to the sheet-shaped gasket mounting member by using the adhesive agent.

Further, in the gasket in accordance with the third aspect of the present invention provided with the structure mentioned above, since the main body is made of the adhesive rubber and is integrally formed on another face of the sheet-shaped gasket mounting member by using the adhesive property of the adhesive rubber, the sheet-shaped gasket mounting member also serves as the effect of reinforcing the gasket main body, so that it is possible to restrict the deformation of the whole of the gasket comparatively small at a time of handling. Further, since the gasket main body is integrated with the sheet-shaped gasket mounting member and is later bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. The gasket main body made of the adhesive rubber is bonded to the sheet-shaped gasket mounting member due to the adhesive property without using the adhesive agent.

Further, in the gasket in accordance with the fourth aspect of the present invention provided with the structure mentioned above, since the gasket main body is integrally formed on both faces of the end portion of the sheet-shaped gasket mounting member by using the adhesive agent, the sheet-shaped gasket mounting member also serves as the effect of reinforcing the gasket main body, so that it is possible to restrict the deformation of the whole of the gasket comparatively small at a time of handling. Further, since the gasket main body is integrated with the sheet-shaped gasket mounting member and is later bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. Further, since the gasket main body is integrally formed on both faces of the end portion of the sheet-shaped gasket mounting member, the both-face gasket is formed, and the gasket main body is in direct contact with the other end mounting member, so that it is possible to securely seal between the gasket and the other end mounting member. In this case, in order to integrally form the gasket main body on both faces of the end portion of the sheet-shaped gasket mounting member by using the adhesive agent, there are a method of forming the gasket main body in a state of attaching the sheet-shaped gasket mounting member having the adhesive agent applied thereto to the molding die for forming the gasket main body, thereby integrating both the elements at the same time when the forming is finished, and a method of independently forming the gasket main body in the product shape and thereafter bonding the gasket main body to the sheet-shaped gasket mounting member by using the adhesive agent.

Further, in the gasket in accordance with the fifth aspect of the present invention provided with the structure mentioned above, since the main body is made of the adhesive rubber and is integrally formed on both faces of the end portion of the sheet-shaped gasket mounting member by using the adhesive property of the adhesive rubber, the sheet-shaped gasket mounting member also serves as the effect of reinforcing the gasket main body, so that it is possible to restrict the deformation of the whole of the gasket comparatively small at a time of handling. Further, since the gasket main body is integrated with the sheet-shaped gasket mounting member and is later bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. Further, since the gasket main body is integrally formed on both faces of the end portion of the sheet-shaped gasket mounting member, the both-face gasket is formed, and the gasket main body is in direct contact with the other end mounting member, so that it is possible to securely seal between the gasket and the other end mounting member. The gasket main body made of the adhesive rubber is bonded to the sheet-shaped gasket mounting member due to the adhesive property without using the adhesive agent.

Further, in the gasket in accordance with the sixth aspect of the present invention provided with the structure mentioned above, since the adhesive agent is attached to one face of the sheet-shaped gasket mounting member and the mold releasing film is releasably attached to the one face, it is possible to protect the adhesive agent by the mold releasing film before the mounting work of the gasket, and it is possible to mount the gasket to the other end mounting member in accordance with a simple work obtained only by for peeling the mold releasing film and positioning and pressing the gasket, at a time of the mounting work. The portion peeling the mold releasing film at a time of the mounting work is provided all around the periphery of the gasket, however, in the case that a necessary adhesive force is secured even when the adhesive area is small, this portion may be provided in some parts on the periphery of the gasket (the seventh aspect).

Further, in the gasket in accordance with the eighth aspect of the present invention provided with the structure mentioned above, since the integral product of the rubber-only gasket main body and the sheet-shaped gasket mounting member provided in some parts on the periphery of the gasket main body is formed, and the sheet-shaped gasket mounting member is provided with the sticking function on one face thereof, it is possible to mount the gasket to the other end mounting member in accordance with the simple work obtained only by positioning and pressing the gasket, at a time of the mounting work of the gasket. As a cross sectional shape of the gasket main body of the rubber-only type, the O-ring shape (the ninth aspect) or the lip shape (the tenth aspect) is preferable. In accordance with these shapes, it is possible to form the both-face gasket, so that it is possible to securely seal between the gasket and the other end mounting member.

In this case, in conjunction with the inventions in accordance with the first to seventh aspects, the following technical matters are included in the present application.

That is, in order to achieve the object mentioned above, one gasket proposed by the present application is provided with the following contents.

(1) A gasket for sealing a fuel gas and an oxidizer gas between an MEA and a separator which are used for a fuel battery or a gasket for sealing a refrigerant between the separators, in which the gasket is integrated with the separator by integrally forming an adhesive rubber directly on a resin film in which an adhesive agent (an adhesive compound) is applied to one face. Or a gasket for sealing a sealing fluid such as a fuel gas or an oxidizer gas between an MEA and a separator which are used for a fuel battery or a gasket for sealing the sealing fluid such as a refrigerant between the separators, in which the gasket is integrated with the other end mounting member such as the separator by integrally forming an adhesive rubber directly on a sheet-shaped gasket mounting member such as a resin film in which an adhesive agent (an adhesive compound) is applied to one face.

(2) A gasket for sealing a fuel gas and an oxidizer gas between an MEA and a separator which are used for a fuel battery or a gasket for sealing a refrigerant between the separators, in which the gasket is formed by integrally forming a rubber on another face of a resin film in which an adhesive agent (an adhesive compound) is applied to one face, by using an adhesive agent, or integrally forming an adhesive rubber directly. Or a gasket for sealing a sealing fluid such as a fuel gas or an oxidizer gas between an MEA and a separator which are used for a fuel battery or a gasket for sealing the sealing fluid such as a refrigerant between the separators, in which the gasket is formed by integrally forming a rubber on another face of a sheet-shaped gasket mounting member such as a resin film in which an adhesive agent (an adhesive compound) is applied to one face, by using an adhesive agent, or integrally forming an adhesive rubber directly.

(3) A separator integrated type gasket in which the gasket in accordance with the item (1) or (2) mentioned above is integrated with the separator by using an adhesive agent (an adhesive compound) of a film. Or a gasket in which the gasket in accordance with the item (1) or (2) mentioned above is integrated with the separator by using an adhesive agent (an adhesive compound) of a sheet-shaped gasket mounting member such as a film.

(4) An MEA integrated type gasket in which the gasket in accordance with the item (1) or (2) mentioned above is integrated with the MEA by using an adhesive agent (an adhesive compound) of a film. Or a gasket in which the gasket in accordance with the item (1) or (2) mentioned above is integrated with the MEA by using an adhesive agent (an adhesive compound) of a sheet-shaped gasket mounting member such as a film.

(5) As a mode for carrying out the invention in accordance with the items (1) to (4) mentioned above, in order to solve the problem in the conventional art, there is provided a separator integrated type or MEA integrated type gasket formed by applying an adhesive agent (an adhesive compound) such as a silicone adhesive agent (a silicone adhesive compound) onto one face of a resin film such as a polyethylene terephthalate, a polyethylene naphthalate or a polyimide, and integrally forming a rubber by applying an adhesive agent to a back side of the adhesive agent (adhesive compound) applied surface, or integrally forming an adhesive rubber directly, and thereafter sticking a resin film to the separator or the MEA. In the case that the gasket is integrally formed via the adhesive agent, the gasket employs a material constituted by a silicone rubber, a fluorine rubber, a nitrile rubber, a butyl rubber, an EPDM or the like. Further, a material of the adhesive rubber which can be directly bonded to the resin film is not limited, however, for example, in the case of the silicone rubber material, X-34-1277A/B (trade name) produced by Shinetsu Chemical Co., Ltd. or the like is preferably used. A resin film which can bear with about 100 to 200° C. corresponding to a temperature at which the rubber mentioned above can be formed is selected as the resin film, and a film having thickness between 10 and 500 μm, preferably, between 50 and 150 μm is used. As the resin film, a generalized film of a polyethylene terephthalate, a polyethylene naphthalate, a polyimide, an ester, an amide, an imide or the like can be used, and for example, in the case of the polyethylene terephthalate, a Dialami 100μ (trade name) produced by Mitsubishi Resin Co., Ltd. or the like is preferably used. At a time of forming the gasket, the film cut in a sheet shape or a seal shape is clamped by the molds and injection molded. In the case that the film is formed in the sheet shape, it is necessary to cut in the seal shape after molding, and in the case that the film is formed in the seal shape, it is necessary that a presser margin of a metal mold is provided in the periphery of the seal lip portion. The adhesive agent (the adhesive compound) is set to the silicone type, and thickness of application is set not more than 100 μm, preferably between 10 and 15 μm. The resin film and the separator are integrated by the adhesive agent (the adhesive compound) in accordance with a thermo compression bonding. As the adhesive agent (the adhesive compound), for example, TSR 1512 (trade name) produced by Toshiba Silicone Co., Ltd. or the like can be preferably used.

(6) Further, in accordance with the items (1) to (5) mentioned above, the following operations and effects can be achieved.

That is, first, since the gasket is integrated or later bonded via the sheet-shaped gasket mounting member such as the resin film or the like, it is possible to easily integrate the gasket with the other end mounting member such as the separator (a brittle material, a thin product) having low strength which has been conventionally hard to be integrally formed. Further, since the gasket is integrally formed with the sheet-shaped gasket mounting member such as the resin film or the like in place of the separator, and the sheet-shaped gasket mounting member such as the resin film or the like does not have the possibility of being broken as in the separator, it is possible to make the mold clamping force high, whereby it is possible to inhibit a lot of burrs from being generated at a time of molding. Still further, since the sheet-shaped gasket mounting member such as the resin film or the like serves as the reinforcing member, a handling property is good, and since the adhesive agent (the adhesive compound) is attached to the sheet-shaped gasket mounting member such as the resin film or the like, it is possible to omit a step of applying the adhesive agent (the adhesive compound), whereby it is possible to achieve to stabilize a quality. The results of check tests of an adhesive property (a sticking property) with respect to the separator or the MEA carried out by the inventors of the present application, are shown in FIG. 1.

Further, in conjunction with the inventions in accordance with the first to seventh aspects, the following technical matters are included in the present application.

That is, in order to achieve the object mentioned above, one gasket proposed by the present application is provided with the following contents.

(7) A gasket structured such that a seal surface is positioned on both faces of a film having a structure constituted by three layers comprising a resin film, an adhesive agent (an adhesive compound) and a mold releasing film, in which the gasket is formed in a shape completely covering one side end face of the three-layer film, and the three-layer film is exposed in a portion close to an opposite side end face. Or, a gasket structured such that a seal surface is positioned on both faces of a film having a structure constituted by three layers comprising a sheet-shaped gasket mounting member such as a resin film, an adhesive agent (an adhesive compound) and a mold releasing film, in which the gasket is formed in a shape completely covering one side end face of the three-layer film, and the three-layer film is exposed in a portion close to an opposite side end face.

(8) A gasket structured such that a seal surface is positioned on both faces of a film having a structure constituted by three layers comprising a resin film, an adhesive agent (an adhesive compound) and a mold releasing film, in which the gasket is formed in a shape completely covering one side end face of the three-layer film, and a portion close to an opposite side end face is formed in a shape in which the three-layer film is exposed, and the adhesive agent (the adhesive compound) can be exposed by peeling the mold releasing film only in a portion close to the end face in which the three-layer film is exposed. Or, a gasket structured such that a seal surface is positioned on both faces of a film having a structure constituted by three layers comprising a sheet-shaped gasket mounting member such as a resin film, an adhesive agent (an adhesive compound) and a mold releasing film, in which the gasket is formed in a shape completely covering one side end face of the three-layer film, and a portion close to an opposite side end face is formed in a shape in which the three-layer film is exposed, and the adhesive agent (the adhesive compound) can be exposed by peeling the mold releasing film only in a portion close to the end face in which the three-layer film is exposed.

(9) An integral product of a separator for a fuel battery and a gasket manufactured by sticking the gasket in accordance with the item (7) or (8) mentioned above to the separator for the fuel battery. Or, an integral product of the other end mounting member such as a separator for a fuel battery and a gasket manufactured by sticking the gasket in accordance with the item (7) or (8) mentioned above to the other end mounting member such as the separator for the fuel battery.

(10) A gasket in which the end face which is not covered with the rubber of the three-layer film in accordance with the item (7) or (8) mentioned above is all the periphery (is arranged in all the periphery) of the gasket.

(11) A gasket in which the end face which is not covered with the rubber of the three-layer film in accordance with the item (7) or (8) mentioned above is not all the periphery (is not arranged in all the periphery) of the gasket, that is, the portion in which the adhesive agent is exposed is dispersed on the periphery of the gasket.

(12) The products in the five items mentioned above include a product used in an HDD.

(13) An integrated product of a separator for a fuel battery and a gasket structured such that a rubber is formed so as to cover one side end face of a film having a structure constituted by three layers comprising a resin film, an adhesive agent (an adhesive compound) and a mold releasing film, in which the mold releasing film is partly peeled in a portion close to an opposite side end face so as to be stuck to the separator. Or, an integrated product of the other end mounting member such as a separator for a fuel battery and a gasket structured such that a rubber is formed so as to cover one side end face of a film having a structure constituted by three layers comprising a sheet-shaped gasket mounting member such as a resin film, an adhesive agent (an adhesive compound) and a mold releasing film, in which the mold releasing film is partly peeled in a portion close to an opposite side end face so as to be stuck to the other end mounting member such as the separator.

(14) As a mode for carrying out the invention in accordance with the items (7) to (13) mentioned above, there is manufactured a gasket structured such that a seal surface is positioned on both faces of a film having a structure constituted by three layers comprising a resin film, an adhesive agent (an adhesive compound) and a mold releasing film, in which the gasket is formed in a shape completely covering one side end face of the three-layer film, and an opposite side end face is formed in a shape in which the three-layer film is exposed. An integrated product of the separator for the fuel battery and the gasket is completed by peeling the mold releasing film in the portion close to the end face in which the three-layer film is exposed so as to expose the adhesive agent (the adhesive compound), and sticking to the separator by utilizing the adhesive agent (the adhesive compound). Further, there are two cases comprising a case that the end face in which the three-layer film is not covered with the rubber is all the periphery of the gasket, and a case that it is dispersed on the periphery of the gasket. A material of the film employs PET, PI, PEN or the like. The rubber preferably employs an adhesive material which reacts to the resin film at a time of vulcanizing so as to be chemically bonded, and may employ a liquid rubber or a solid rubber.

(15) Further, in accordance with the items (7) to (14) mentioned above, it is possible to provide the gasket which gives a high sealing property without depending on the material or the surface roughness of the other end mounting member such as the separator or the like, and it is possible to provide a product by which the difficulty at a time of assembling the gasket in the other end mounting member such as the separator or the like can be solved.

Further, in conjunction with the inventions in accordance with the eighth aspect to the tenth aspect mentioned above, the following technical matters are included in the present application.

(16) A gasket used for a fuel battery, the gasket being a resin film integrated type gasket structured such that a film constituted by three layers comprising a resin film, an adhesive agent (an adhesive compound) and a mold releasing film is integrated in a part of a rubber-only portion, in which a cross sectional shape of the gasket is an O-ring shape. Or, a gasket used for a fuel battery or the like, the gasket being structured such that a film constituted by three layers comprising a sheet-shaped gasket mounting member such as a resin film, an adhesive agent (an adhesive compound) and a mold releasing film is integrated in a part of a rubber-only portion, in which a cross sectional shape of the gasket is an O-ring shape

(17) A gasket used for a fuel battery, the gasket being a resin film integrated type gasket structured such that a film constituted by three layers comprising a resin film, an adhesive agent (an adhesive compound) and a mold releasing film is integrated in a part of a rubber-only portion, in which a cross sectional shape of the gasket is a lip shape. Or, a gasket used for a fuel battery or the like, the gasket being structured such that a film constituted by three layers comprising a sheet-shaped gasket mounting member such as a resin film, an adhesive agent (an adhesive compound) and a mold releasing film is integrated in a part of a rubber-only portion, in which a cross sectional shape of the gasket is a lip shape.

(18) An integrated product in which the product in accordance with the item (16) or (17) mentioned above is stuck to the other end mounting member such as an electrolyte membrane for the fuel battery.

(19) An integrated product in which the product in accordance with the item (16) or (17) mentioned above is stuck to a separator for the fuel battery.

(20) The gasket having the structure mentioned above is also used as a gasket for an HDD.

(21) An integrated type gasket for a fuel battery, in which a film constituted by three layers comprising a resin film, an adhesive agent (an adhesive compound) and a mold releasing film is inserted to a part of a rubber-only gasket, and only a part of the mold releasing film mentioned above is peeled. Or, a gasket in which a film constituted by three layers comprising a sheet-shaped gasket mounting member such as a resin film, an adhesive agent (an adhesive compound) and a mold releasing film is inserted to a part of a rubber-only gasket, and only a part of the mold releasing film mentioned above is peeled.

(22) A separator integrated type gasket for a fuel battery or an electrolyte membrane integrated type gasket for a fuel battery, in which a film constituted by three layers comprising a resin film, an adhesive agent (an adhesive compound) and a mold releasing film is inserted to a part of a rubber-only gasket, only a part of the mold releasing film mentioned above is peeled, and the portion in which the mold releasing film is peeled is stuck to a separator or an electrolyte. Or, a gasket structured such that a film constituted by three layers comprising a sheet-shaped gasket mounting member such as a resin film, an adhesive agent (an adhesive compound) and a mold releasing film is inserted to a part of a rubber-only gasket, only a part of the mold releasing film mentioned above is peeled, and the portion in which the mold releasing film is peeled is stuck to a separator or an electrolyte.

(23) As a mode for carrying out the invention in accordance with the items (16) to (22) mentioned above, a film constituted by three layers comprising a resin film, an adhesive agent (an adhesive compound) and a mold releasing film is inserted to a part of a rubber-only gasket. The gasket preferably employs silicone rubber, EPDM, fluorine rubber or the like as a material, and a hardness of the gasket is preferably set to Hs20 to 70. The cross sectional shape of the gasket may be designed by taking into consideration a reaction force condition or the fluid to be sealed and a pressure of the rubber, for example, a circular shape, a lip shape of the like is employed. PET, PEN, PI or the like is employed for the resin film, and it is preferable that a thickness of the resin film is between 50 µm and 100 µm. The adhesive agent (the adhesive compound) is applied to one face of the film, and this one face is protected by the mold releasing film. The three-layer structure film is inserted to some positions on a gasket layout within the metal mold at a time of molding the rubber so as to be integrally formed. Since a main cross section of the gasket is formed only by the rubber, a sealing property and a compression set are not deteriorated by the resin film being inserted. At a time of assembling the fuel battery, since the adhesive agent (the adhesive compound) is exposed by peeling the mold releasing film in the three-layer film, it is possible to stick and fix to some positions on the separator or the electrolyte membrane. In accordance with this structure, a handling at a time of assembling the gasket is improved.

(24) Further, in accordance with the structure of the items (16) to (23) mentioned above, the following effects can be obtained. That is, since the sticking portion and the gasket portion are separated, it is possible to improve a sealing performance, and since the sticking portion is provided partly in some positions in place of all the surface of the gasket, the sticking work can be easily carried out, and it is unnecessary to apply the adhesive agent (the adhesive compound) at a time of integrating the gasket with the other end mounting member such as the separator or the like.

Further, in the gasket in accordance with the eleventh aspect of the present invention provided with the structure mentioned above, there is provided the gasket as recited in any one of the first to tenth aspect mentioned above, wherein the gasket is provided with a gasket main body for the arranged on both faces of the other end mounting member, and the sheet-shaped gasket mounting member which is integrally formed in the gasket main body on both faces, and the gasket is bent in two at a time of being mounted to the other end mounting member so as to be stuck to both faces of the other end mounting member. Accordingly, it is possible to manufacture and handle the gasket by combining actually two gaskets required on both faces of the other end mounting member into one. In this case, it is preferable that the sheet-shaped gasket mounting member integrally has a portion stuck to one face side of the other end mounting member, a portion stuck to another face side, and a connection portion connecting the both portions, and is manufactured so as to be bent in the connection portion at a time of being mounted (the twelfth aspect). Further, the connection portion is provided with a bending position specifying portion such as a slit, a perforated line or the like in order to facilitate the bending of the connection portion (the thirteenth aspect).

In this case, in conjunction with the invention in accordance with the eleventh to thirteenth aspects mentioned above, the following technical matters are included in the present application.

(25) A resin film integrated type gasket used in a fuel battery, in which a gasket for two portions to be stuck onto both faces of an electrolyte membrane on one sheet of resin film is integrally formed with the resin film. Or, a gasket of a type of a sheet-shaped gasket mounting member such as a resin film being integrated, used in a fuel battery, in which a gasket for two portions to be stuck onto both faces of the other end mounting member such as an electrolyte membrane on one sheet of sheet-shaped gasket mounting member such as the sheet-shape gasket mounting member is integrally formed with the resin film.

(26) An integrated product in accordance with the item (25) mentioned above, in which the adhesive agent (the adhesive compound) is applied to an opposite face of the resin film on which the gasket is not formed. Or, an integrated product in accordance with the item (25) mentioned above, in which the adhesive agent (the adhesive compound) is applied to an opposite face of the sheet-shaped gasket mounting member such as the resin film on which the gasket is not formed.

(27) An integrated product in accordance with the item (25) or (26) mentioned above, in which the gasket is integrated with the resin film by an adhesive rubber. Or, an integrated product in accordance with the item (25) or (26) mentioned above, in which the gasket is integrated with the sheet-shaped gasket mounting member such as the resin film by an adhesive rubber. Or, an integrated product in accordance with the item (25) or (26) mentioned above, in which the gasket is formed by an adhesive rubber, and is integrated with the sheet-shaped gasket mounting member such as the resin film by an adhesive property thereof.

(28) An integrated product in accordance with the item (25) or (26) mentioned above, in which an adhesive agent is previously applied to the resin film for forming the gasket thereon, and the rubber is integrated with the resin film via the adhesive agent. Or, an integrated product in accordance with the item (25) or (26) mentioned above, in which an adhesive agent is previously applied to the sheet-shaped gasket mounting member such as the resin film for forming the gasket, and the rubber is integrated with the sheet-shaped gasket mounting member via the adhesive agent.

(29) An integrated product, in which the gasket in accordance with any one of the item (25) to (28) mentioned above is formed in accordance with an injection molding method, a dispenser method and a printing method.

(30) An integrated product of an electrolyte membrane and a gasket, in which the integrated product in accordance with any one of the items (25) to (28) mentioned above is stuck to the electrolyte membrane. Or, an integrated product of the other end mounting member and a gasket, in which the integrated product in accordance with anyone of the items (25) to (28) mentioned above is stuck to the other end mounting member such as an electrolyte membrane.

(31) An integrated product structured such that a gasket is formed on a resin film, in which the gasket is a resin film integrated type gasket for being stuck on both faces of an electrolyte membrane, and the gasket for both faces is formed on one sheet of resin film. An integrated product of an electrolyte membrane and a gasket, in which an adhesive agent (an adhesive compound) is applied to the opposite side of the resin film, and the gasket is integrated with the electrolyte membrane via the adhesive agent. Or, an integrated product structured such that a gasket is formed on a sheet-shaped gasket mounting member such as a resin film, in which the gasket is of a type that the sheet-shaped gasket mounting member such as the resin film is integrated for being stuck on both faces of the other end mounting member such as an electrolyte membrane, and the gasket for both faces is formed on one sheet of sheet-shaped gasket mounting member such as the resin film. An integrated product of the other end mounting member and a gasket, in which an adhesive agent (an adhesive compound) is applied to the opposite side of the sheet-shaped gasket mounting member such as the resin film, and the gasket is integrated with the other end mounting member such as the electrolyte membrane via the adhesive agent.

(32) As a mode for carrying out the invention in accordance with the items (25) to (31) mentioned above, the gasket is formed on the opposite face of the resin film to which the adhesive agent (the adhesive compound) is applied. The method of manufacturing the gasket comprises the injection molding, the dispenser or the printing. The rubber to be used is integrated with the resin film by using the rubber material having a selective adhesive property. In the case that the selective adhesive rubber is not used, the adhesive agent is previously applied to the surface of the resin film on which the gasket is formed. The resin film integrated type gasket to be stuck to both faces of the electrolyte membrane is obtained by forming the gasket for both faces on one large resin film at one time. Thereafter, the resin film is punched into the shape to be used. When the gasket is integrated with the electrolyte membrane, one sheet of resin film integrated gasket is bent in two so as to be stuck to both faces of the electrolyte membrane. It is possible to improve a flexibility by forming the shallow cut line in the bent portion of the resin film. The rubber material used for the gasket mainly employs silicone rubber, EPDM or fluorine rubber. The resin film employs the film in which the adhesive agent is applied to one face of PET, PEN or PI. The thickness thereof is between 0.03 to 0.3 mm.

(33) Further, in accordance with the structure mentioned above, the following operations and effects can be achieved.

That is, in the integrated product of the other end mounting member and the gasket, obtained by sticking the integral product of the sheet-shaped gasket mounting member such as the resin film and the gasket in which the gasket is formed on the sheet-shaped gasket mounting member such as the resin film, to the other end mounting member such as the electrolyte membrane, it is necessary to stick the gasket to both faces of the other end mounting member such as the electrolyte membrane. Accordingly, in this case, it is necessary to prepare two kinds of gaskets for both faces. However, since two gaskets required for both faces of the other end mounting member such as the electrolyte membrane are combined into one piece, it is possible to widely reduce a number of man-hour and a cost for manufacturing.

Further, in the gasket in accordance with the seventeenth aspect to the twentieth aspect of the present invention provided with the structure mentioned above, in addition to the structure that the gasket is stuck to both faces of the electrolyte membrane for the fuel battery, the structure is made such that "two or more seal lips are provided in each of the gaskets" (the seventeenth aspect), "each of the gaskets is formed in the squeeze shape having no seal lip" (the eighteenth aspect), "one or more seal lip is provided in one gasket, and another gasket is formed in the squeeze shape having no seal lip" (the nineteenth aspect), or "one or more seal lip is provided in one gasket, and two or more seal lips are provided in another gasket" (the twentieth aspect). This is because of the following reasons.

That is, when the gasket main body is directly formed on the electrolyte membrane of the fuel battery as mentioned above, there is a risk of such a damage as the electrolyte membrane is deformed due to an evaporation of the water content caused by the heat of the molding die, because the electrolyte membrane contains the water. Accordingly, the inventors of the present application have considered a method of forming the gasket main body on the resin film in which the adhesive agent is applied to the face having no gasket main body formed, and sticking the integral product of the resin film and the gasket main body to the electrolyte membrane by the adhesive agent, in place of the above direct forming.

In this case, in the gasket main body, it is important in view of a system of the fuel battery to make a height of the gasket main body low in a state that the gasket main body is collapsed after being set. Since the fuel battery is formed by laminating a lot of fuel battery elementary units called as cells, it is necessary to make a reaction force of the gasket main body small. Further, in order to make the reaction force small, it is important to make a collapsing amount of the gasket main body small. That is, a shape having a small height is required for the gasket main body before being set. Further, on the other hand, it is required for the gasket main body to make a peak surface pressure high, in order to seal the gas within the fuel battery even when the height of the gasket main body is reduced. Further, in order to make the peak surface pressure of the gasket main body high, it is considered that the seal lip is provided in the gasket main body.

However, in this case, as in FIG. 35 shown as a comparative embodiment, in an integrated product of an electrolyte membrane 104 and a gasket main body 105 in which the resin film integrated type gasket main body 105 is stuck to both faces of the electrolyte membrane 104 for a fuel battery, in the case that one seal lip 106 is provided in each of the gaskets 105 on both faces, a computed value can not be obtained at a time when positions of the seal lips 106 are displaces on both the faces. Accordingly, there is a possibility that the peak value of the surface pressure becomes small. When the peak value of the surface pressure is small, a safety ratio of gas leak is lowered. Therefore, in the case that the seal lip 106 is provided in each of the gasket main body 105 on both the faces, it is necessary to precisely align the positions of the seal lips 106 on both the faces. Further, in order to precisely align the positions the seal lips 106 on both the faces, it is necessary to precisely align positions to be stuck of the resin films 107. However, a precise jig is required for the purpose of precisely align the sticking positions of the resin films 107 on both the faces as mentioned above, and a work therefor is very troublesome.

On the contrary, the inventions in accordance with the seventeenth aspect to the twentieth aspect mentioned above propose the gasket shape in which the fear that the peak value of the surface pressure is reduced is not generated even when the sticking positions of the sheet-shaped gasket mounting member (the resin films or the like) on both the faces are displaced slightly, taking the above points into consideration. In order to achieve this, there is employed the structures as mentioned above, that is, "two or more seal lips are provided in each of the gaskets" (the seventeenth aspect) "each of the gaskets is formed in the squeeze shape having no seal lip" (the eighteenth aspect), "one or more seal lip is provided in one gasket, and another gasket is formed in the squeeze shape having no seal lip" (the nineteenth aspect), or "one or more seal lip is provided in one gasket, and two or more seal lips are provided in another gasket" (the twentieth aspect). In accordance with these structures, it is possible to prevent the surface pressure peak of the gasket from being reduced even when the positions of both the faces are displaced slightly.

In this case, in conjunction with the inventions in accordance with the seventeenth aspect to the twentieth aspect, the following technical matters are included in the present application.

That is, in order to achieve the object mentioned above, one gasket proposed by the present application is provided with the following contents.

(34) A shape of an integrated product of an electrolyte membrane and a gasket formed by sticking a resin film integrated type gasket to both faces of the electrolyte membrane for a fuel battery, in which two or more seal lips are provided in the gaskets on both the faces. The gasket shape is symmetrical on both the faces with respect to the electrolyte membrane. Since two or more seal lips are provided, it is possible to deal with even in the case that the positions of the gaskets are displaced on both the faces.

(35) A shape of an integrated product of an electrolyte membrane and a gasket formed by sticking a resin film integrated type gasket to both faces of the electrolyte membrane for a fuel battery, in which no seal lip is provided in the gaskets on both the faces. The gasket shape is symmetrical on both the faces with respect to the electrolyte membrane. Since no seal lip is provided, it is necessary to be formed in a gentle angular shape so as to make the surface pressure peak large. Since no seal lip is provided, it is possible to deal with even in the case that the positions are displaced slightly on both the faces.

(36) A shape of an integrated product of an electrolyte membrane and a gasket formed by sticking a resin film integrated type gasket to both faces of the electrolyte membrane for a fuel battery, in which one or more seal lip is provided in the gasket on one face, and no seal lip is provided in the gasket on another face. The gasket shape is asymmetrical with respect to the electrolyte membrane. Since the seal lip is provided on one face, it is not necessary to worry about the displacement of seal lip positions on both the faces.

(37) A shape of an integrated product of an electrolyte membrane and a gasket formed by sticking a resin film integrated type gasket to both faces of the electrolyte membrane for a fuel battery, in which one seal lip is provided in the gasket on one face, and two or more seal lips are provided in the gasket on another face. The gasket shape is asymmetrical with respect to the electrolyte membrane. Since two or more seal lips are provided on one face, it is possible to deal with.

(38) Further, in accordance with these shapes, even if the positions of both the faces are slightly displaced at a time of sticking the gasket integrated type resin film on both the faces of the electrolyte membrane, it is possible to prevent the surface pressure peak of the gasket from being reduced.

Further, the gasket in accordance with the present invention can be suitably utilized in the gasket for HDD as well as the gasket for the fuel battery.

For example, the HDD is structured such that a hard disc corresponding to a main body of a recording portion, a drive motor, a reading mechanism, a cooling part and the like are housed in a narrow casing. In the gasket for the HDD, in accordance with a requirement of downsizing in the HDD and diversification in the casing shape, a thin shape and a sealing property of a surface having a complex shape are required. Accordingly, in the case of attaching an extremely thin gasket or a gasket having an irregular shape, there is a disadvantage that an assembling property is not so good. Further, there is easily generated a portion which is partly extended, after having been attached, a portion which is slacked, and a portion which is twisted, and the gasket may be deformed at a time when the manufactured gaskets are piled up until being attached or at a time of being transported. Therefore, there is a disadvantage that an carefulness should be paid to handing the gasket in order to secure the sealing performance of the gasket. In accordance with the present invention, it is possible to deal with these disadvantages.

In this case, with respect to the matter that the gasket in accordance with the present invention is used for the HDD, the following technical matters are included in the present application.

That is, in order to achieve the object mentioned above, one gasket proposed by the present application is provided with the following contents.

(39) A gasket for an HDD top cover, in which the gasket is stuck to the HDD top cover by integrally forming a rubber to another face of a resin film in which an adhesive agent (an adhesive compound) is applied to one face by using an adhesive agent, or integrally forming an adhesive rubber directly thereto. Or, a gasket for an HDD top cover, in which the gasket is stuck to the HDD top cover by integrally forming a rubber to another face of a sheet-shaped gasket mounting member such as a resin film in which an adhesive agent (an adhesive compound) is applied to one face by using an adhesive agent, or integrally forming an adhesive rubber directly thereto.

(40) In order to solve the problems in the prior art, a gasket for an HDD top cover, in which the gasket is integrated by applying an adhesive agent (an adhesive compound) of an acrylic type or a silicone type to one face of a resin film made of polyethylene terephthalate, polyethylene naphthalate or polyimide, integrally forming a rubber on back side of a surface to which the adhesive agent (the adhesive compound) is applied, via an adhesive agent or integrally forming an adhesive rubber directly, and thereafter sticking the resin film to a top cover base material. Or, in order to solve the problems in the prior art, a gasket for an HDD top cover, in which the gasket is integrated by applying an adhesive agent (an adhesive compound) of an acrylic type or a silicone type to one face of a sheet-shaped gasket mounting member such as a resin film made of PET, PEN or PI, integrally forming a rubber on the back side of a surface to which the adhesive agent (the adhesive compound) is applied, via an adhesive agent or integrally forming an adhesive rubber directly, and thereafter sticking the sheet-shaped gasket mounting member such as the resin film to a top cover base material.

(41) As a mode for carrying out the invention in accordance with the items (39) to (40) mentioned above, in the case that the gasket is integrally formed via the adhesive agent, the gasket employs a material such as silicone rubber, fluorine rubber, nitrile rubber, butyl rubber, EPDM or the like. Further, a material of the adhesive rubber which can be directly bonded to the resin film is not limited. A resin film which can bear with about 100 to 200° C. corresponding to a temperature at which the rubber mentioned above can be formed is selected as the resin film, and the film having a thickness of 10 to 500 µm, preferably, 50 to 150 µm is used. As the resin film, a generalized film of polyethylene terephthalate, polyethylene naphthalate, polyimide, ester, amide, imide or the like can be used, for example, in the case of polyethylene terephthalate, Dialami 100µ (trade name) produced by Mitsubishi Resin Co., Ltd. or the like is used. At a time of forming the gasket, the resin film cut in a sheet shape or a seal shape is clamped by the molds and the rubber is molded. In the case that the film is formed in the sheet shape, it is necessary to cut in the seal shape after molding, and in the case that the film is formed in the seal shape, it is necessary that a presser margin for a metal mold is provided in the periphery of the seal lip portion. The adhesive agent (the adhesive compound) is set to the acrylic type or the silicone type, and a thickness of application is set not more than 100µm, preferably 10 to 15 µm. The resin film and the top cover base material are integrated by the present adhesive agent in accordance with a thermo compression bonding.

(42) Further, in accordance with the structure of the items (39) to (41) mentioned above, the following operations and effects can be achieved.

That is, since the sheet-shaped gasket mounting member such as the resin film or the like serves as the reinforcing member, a handling property is good, and a workability at a time of later bonding is improved, and since the adhesive agent (the adhesive compound) is attached to the sheet-shaped gasket mounting member such as the resin film or the like, it is possible to omit a step of applying the adhesive agent (the adhesive compound) to the gasket elementary substance, whereby it is possible to stabilize a quality, and a capital investment for evenly applying the adhesive agent (the adhesive compound) is not required. Further, since the gasket is integrally formed and later bonded via the sheet-shaped gasket mounting member such as the resin film, it is possible to easily achieve the integration between a laminated damping steel sheet and the gasket which have been conventionally hard to be integrally formed due to melting out of an inner thermoplastic resin on the basis of the heat and the pressure. Further, since the gasket is integrally formed with the sheet-shaped gasket mounting member such as the resin film, it is not necessary to apply a work for integrating such as a through hole to the top cover base material, so that it is possible to lower cost of the top cover base material.

BRIEF DESCRIPTION OF THE DRAWINGS

FIG. 1 is a table showing results of check test of a gasket adhesive property with respect to a separator or an MEA;

BEST MODE FOR CARRYING OUT THE INVENTION

Next, a description will be given of embodiments in accordance with the present invention with reference to the accompanying drawings.

First Embodiment

Figure 2:
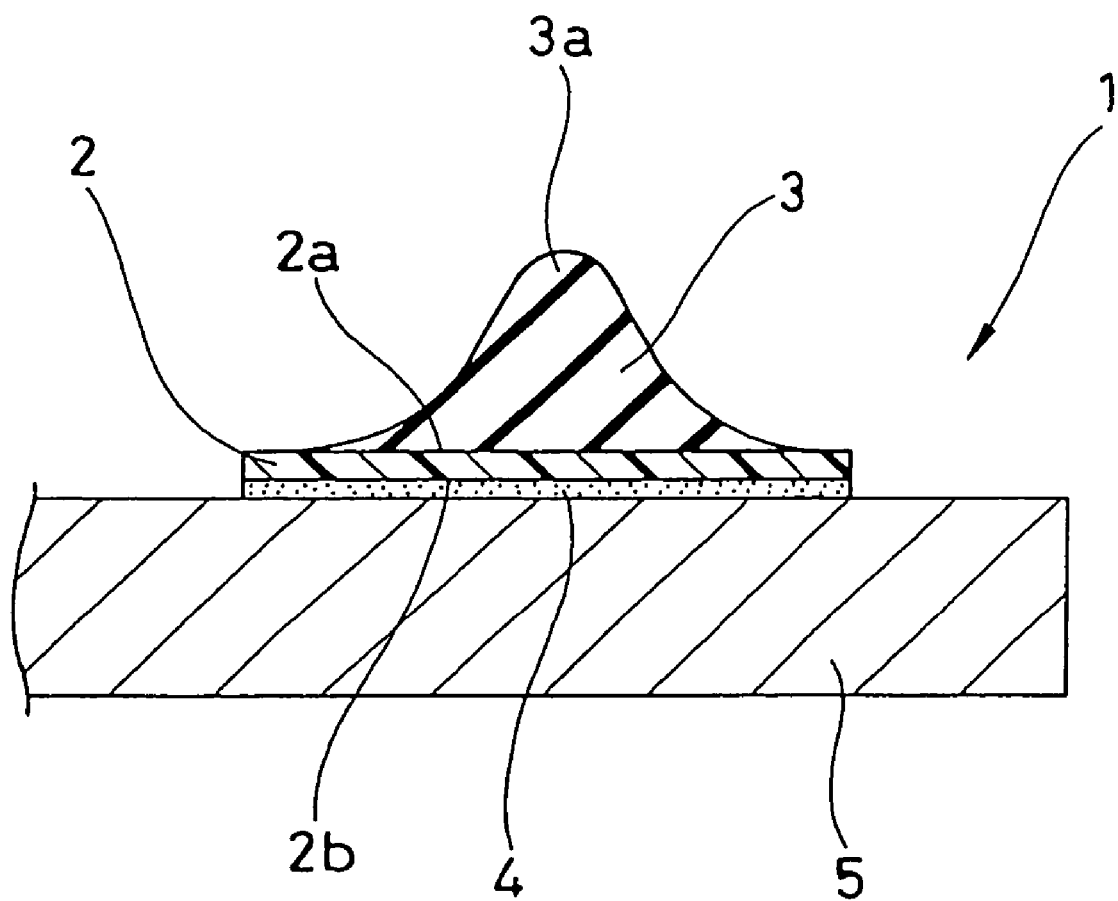
FIG. 2 is a cross sectional view of a main portion of a gasket in accordance with a first embodiment of the present invention.

FIG. 2 shows a cross section (a cut end face) of a main portion of a gasket 1 in accordance with a first embodiment of the present invention. This gasket 1 is used as a gasket for a fuel battery, and is structured as follows.

Figure 3:
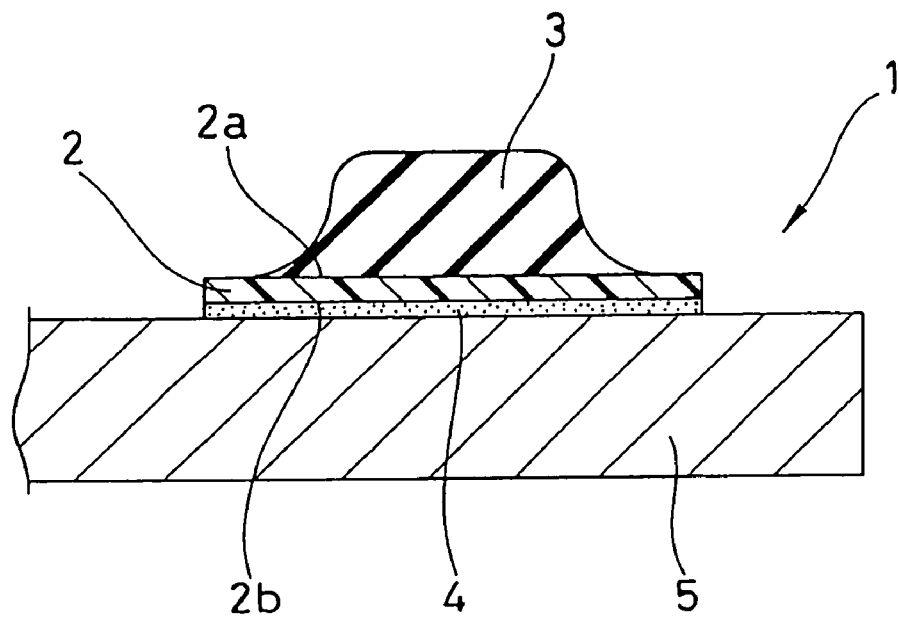
FIG. 3 is a cross sectional view of a main portion of a gasket in accordance with a second embodiment of the present invention.
Figure 4:
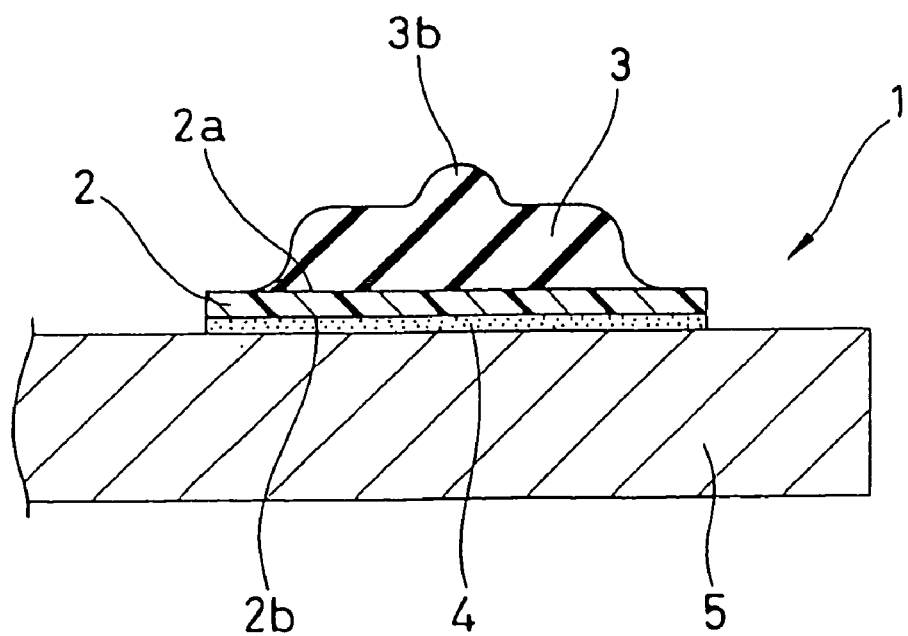
FIG. 4 is a cross sectional view of a main portion of a gasket in accordance with a third embodiment of the present invention.

That is, first, the gasket is provided with a resin film 2 corresponding to a sheet-shaped gasket mounting member, and a rubber 3 corresponding to a gasket main body made of a rubber elastic material is integrally formed on one face (the upper face in the drawing) 2a of the resin film 2 via an adhesive agent (not shown). Further, an adhesive agent (called also as an adhesive compound) 4 is applied to another face (the lower face in the drawing) 2b of the resin film 2, and the resin film 2 in which the rubber 3 is integrally formed is mounted to one face of a separator 5 corresponding to the other end mounting member by the adhesive agent 4. The rubber 3 is formed in a triangle shape or an angular shape in a cross section with a seal lip portion 3a, however, maybe formed in a flat seal structure (a second embodiment) as shown in FIG. 3, or a flat seal structure with a bead-like seal lip (called also as a bead) 3b (a third embodiment) as shown in FIG. 4.

At a time of manufacturing the gasket 1 having the structure mentioned above, an injection molding is carried out in a state in which the resin film 2 in which the adhesive agent is previously applied to one face 2a is attached to a molding die for injection molding the rubber 3, and the rubber 3 is bonded to one face 2a of the resin film 2 at the same time of the molding (an insert molding). Next, an integrally formed product constituted by the resin film 2 and the rubber 3 is taken out from the molding die, the adhesive agent 4 is applied to another face 2b of the resin film 2, and the integrally formed product is bonded to one face of the separator 5 by the adhesive agent 4. The separator 5 may be replaced by an electrolyte membrane in a reaction electrode portion (MEA), an electrode with catalyst or the like.

In accordance with the gasket 1 having the structure mentioned above, the following operations and effects can be achieved.

That is, first, the integrally formed product of the gasket constituted by the resin film 2 and the rubber 3 is manufactured on the basis of the structure mentioned above, and in this integrally formed product, the resin film 2 serves as a reinforcing member with respect to the rubber 3. Accordingly, since a shape retaining property of the gasket 1 is improved in comparison with the product constituted by a rubber elementary substance, and the gasket 1 is hard to be deformed as a whole, it is possible to improve a handling property or an assembling workability of the gasket 1.

Further, since the rubber 3 is integrally formed with the resin film 2 and is later bonded to the separator 5 via the resin film 2, it is not necessary to attach the separator 5 to the molding die at a time of molding the rubber 3. Accordingly, since there is no risk that a crack or the like is generated even in the case that the separator 5 is made of a material having a low strength or a thin plate, it is possible to easily integrate the separator 5 with the gasket 1.

Further, since the resin film 2 attached to the molding die in place of the separator 5 has no fear that the crack or the like is generated, it is possible to set a mold clamping force large at a time of molding. Accordingly, it is possible to prevent a lot of rubber burrs from being generated at a time of molding.

Further, since the structure is made such that the gasket 1 is mounted to the separator 5 corresponding to the other end mounting member in accordance with a sticking function achieved by the adhesive agent 4 provided on another face 2b of the resin film 2, the gasket 1 can be mounted to the separator 5 in accordance with a simple work only of positioning and pressing the gasket 1.

In this case, in the embodiment mentioned above, in place of the structure that the rubber 3 is integrally formed on one face 2a of the resin film 2 via the adhesive agent, the adhesive rubber may be integrally formed directly without applying the adhesive agent, as mentioned above. Further, the rubber which is previously formed in the product shape independently may be bonded to one face 2a of the resin film 2 by the adhesive agent.

Fourth Embodiment

Figure 5:
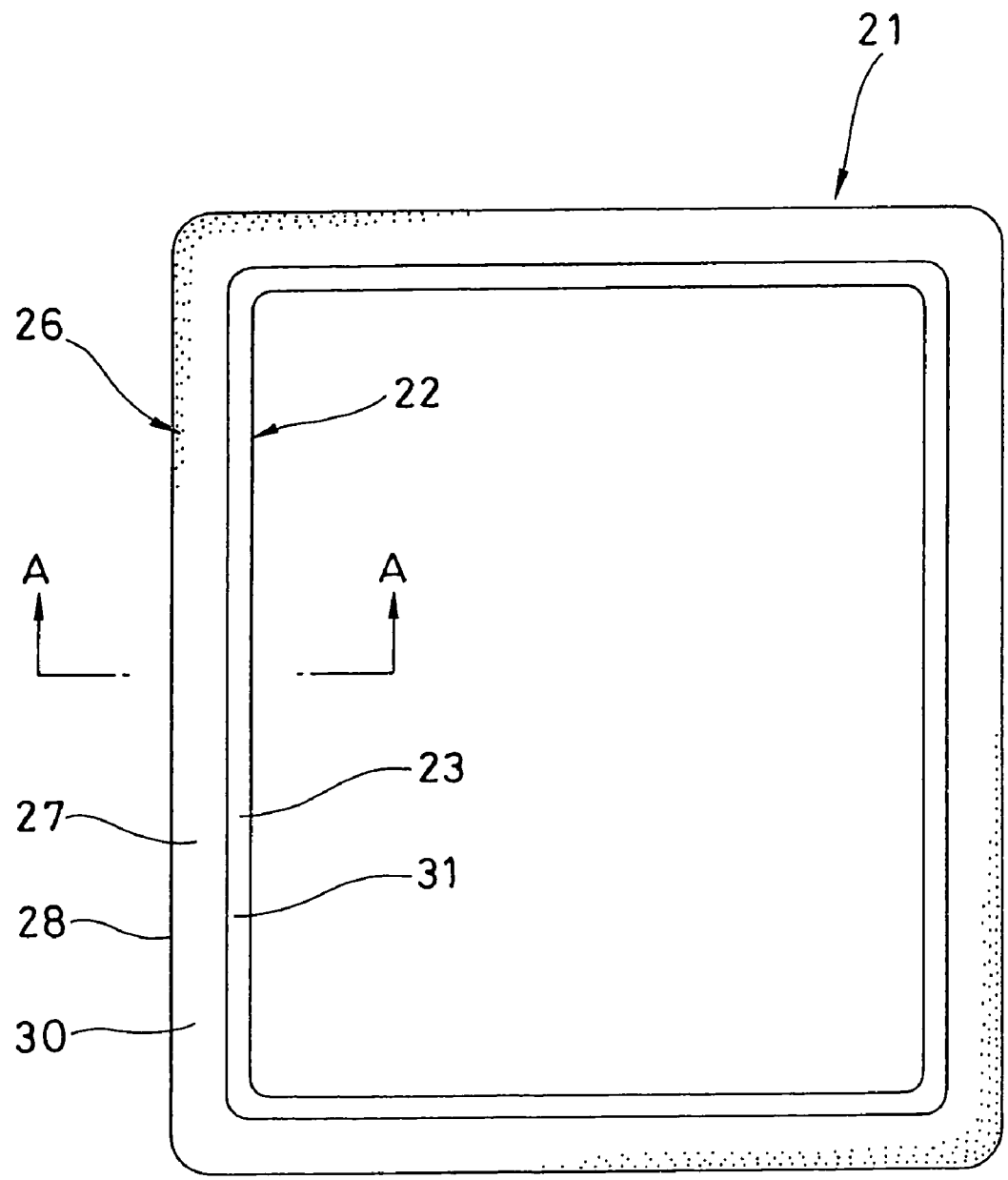
FIG. 5 is a plan view of a gasket in accordance with a fourth embodiment of the present invention.
Figure 6:
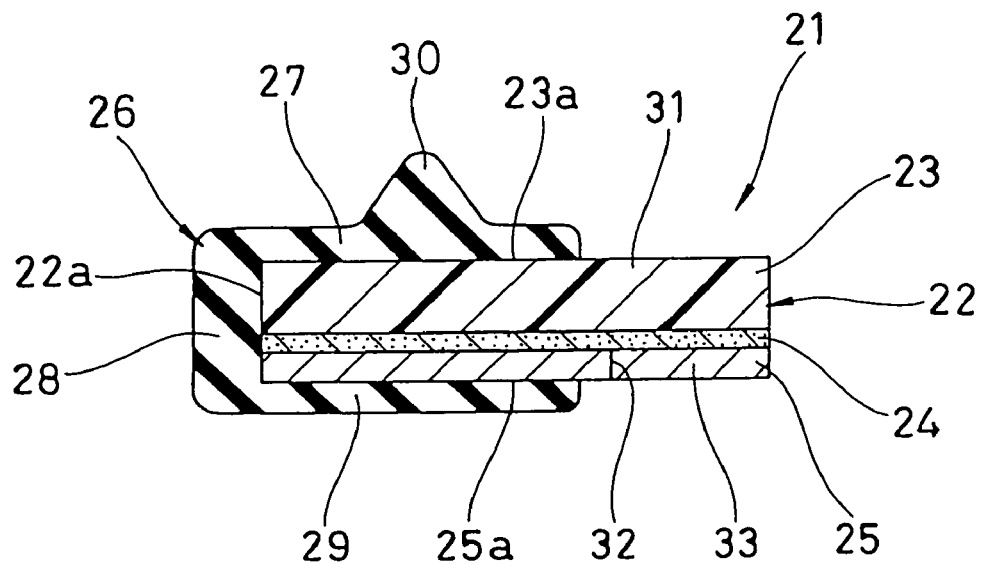
FIG. 6 is an enlarged cross sectional view along a line A-A in FIG. 5.

FIG. 5 shows a plan view of a gasket 21 in accordance with a fourth embodiment of the present invention, and an enlarged cross section along a line A-A (a cut end face) is shown in FIG. 6. This gasket 21 is used as a gasket for a fuel battery, and is structured as follows.

That is, first, an adhesive agent 24 is attached to one face (the lower face in FIG. 6) of a resin film 23 corresponding to a sheet-shaped gasket mounting member, a mold releasing film 25 is attached to the adhesive agent 24 so as to be freely peeled, a laminated film body 22 constituted by a three-layer structure as above is provided, and a gasket main body 26 made of a rubber elastic material is integrated with the film body 22 in accordance with a bonding means such as an insert molding, a boding, a fitting or the like. The resin film 23 is formed in a predetermined plane layout in conformity with a plane shape of the fuel battery and is formed in an endless shape, and is further formed in a shape having a uniform width all around an entire periphery. The adhesive agent 24 is attached to one face of the resin film 23 all around an entire surface, and the mold releasing film 25 is formed in the same plane shape as that of the resin film 23.

The gasket main body 26 made of the rubber elastic material integrally has a resin film side portion 27 attached to a part of a plane (the upper face in FIG. 6) 23a of the resin film 23 in the film body 22, an end face side portion 28 attached to an outer end face (an outer side face, a left end face or a left side face in the drawing) 22a of the film body 22, and a mold releasing film side portion 29 attached to a part of a plane (the lower face in the drawing) 25a of the mold releasing film 25, and is formed in an approximately C shape in a cross section. The resin film side portion 27 forms an upper face seal portion, and a seal lip portion 30 having an approximately triangular shape in a cross section is provided in this portion 27. The mold releasing film side portion 29 forms a lower face seal portion, and this portion 29 is formed in a plane shape. Both the portions 27 and 29 form a pair in upper and lower sides, and form a both-face gasket.

The laminated film body 22 is not entirely covered with the gasket main body 26, an inner portion (the right portion in the drawing) thereof is exposed all around an entire periphery, and a slit portion 32 is provided in the mold releasing film 25 in an exposed portion 31 all around an entire periphery. Accordingly, the mold releasing film 25 is structured such that an inner portion 33 than the slit portion 32 is peeled by gripping and pulling the inner portion 33 by fingers, and the adhesive agent 24 existing in an inner face thereof is exposed in this peeled portion. Therefore, the gasket 21 is mounted to a predetermined portion of the other end mounting member on the basis of an adhesion effect or a sticking function of the exposed adhesive agent 24.

Figure 7:
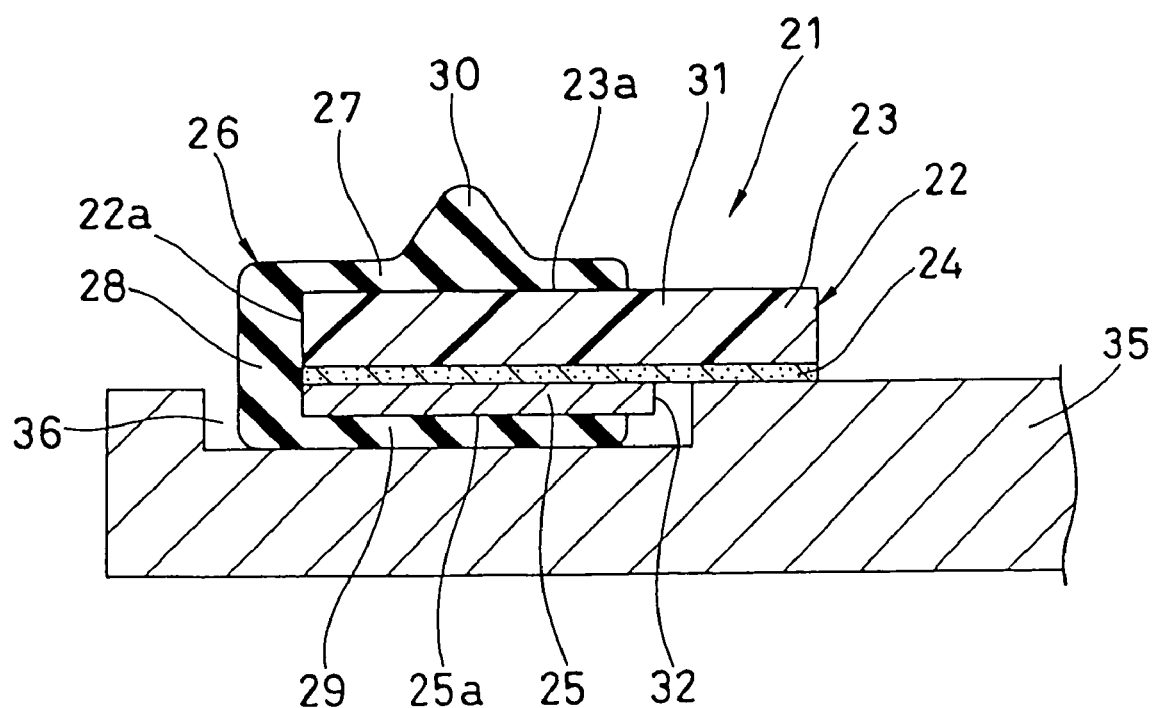
FIG. 7 is a cross sectional view of a main portion showing a state in which the gasket is attached.

FIG. 7 shows a mounting state of the gasket 21, and a groove-like gasket attaching portion 36 is previously provided on one face of the separator 35 corresponding to the other end mounting member so as to be aligned in height. Accordingly, at a time of mounting the gasket 21 to the separator 35, the inner portion 33 of the mold releasing film 25 is peeled from the film body 22 as mentioned above, the mold releasing film side portion 29 of the gasket main body 26 is fitted to the attaching portion 36 so as to be positioned, and the exposed portion 31 of the film body 22 is pressed to the separator 35.

In accordance with the gasket 21 having the structure mentioned above, the same operations and effects as those of the gasket 1 in accordance with the first embodiment can be achieved. In addition, since the both-face gasket is formed in the gasket main body 26 made of the rubber elastic material, and in particular, the mold releasing film side portion 29 is formed in the separator 35 corresponding to the other end mounting member as one of both the faces so as to be in direct contact with the separator 35, it is possible to effectively seal between the film body 22 and the separator 35 by this mold releasing film side portion 29. Accordingly, it is possible to obtain a high sealing performance without depending on a material, a surface roughness or the like of the separator 35, and a high sealing performance can be obtained even in the case that a sealing effect is small only by the adhesive agent 24.

Further, since the structure is made such that the mounting to the separator 35 is achieved not by the entire plane of the adhesive agent 24 applied to the entire face of the lower face of the resin film 23 but by the partial plane, the sticking area is comparatively small, so that it is possible to make a positioning work at a time of sticking the gasket 21 to the separator 35 easy.

Further, since the structure is made such that the gasket 21 can be mounted to the separator 35 corresponding to the other end mounting member on the basis of the sticking function obtained by the adhesive agent 24 applied to the lower face of the resin film 23, it is possible to mount the gasket 21 to the separator 35 on the basis of a simple work only of positioning the gasket 21 and pressing the exposed portion 31 of the film body 22.

Figure 8:
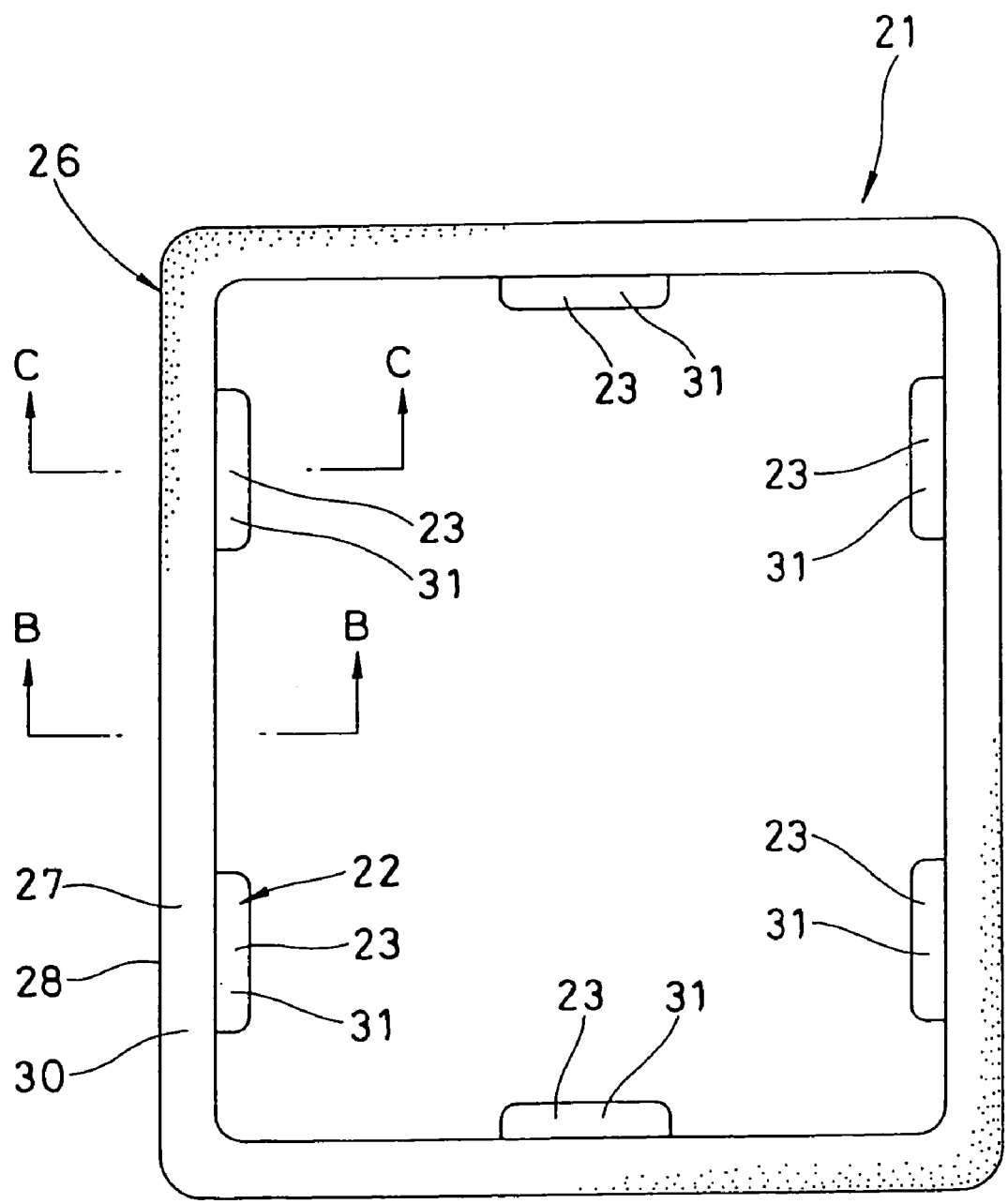
FIG. 8 is a plan view of a gasket in accordance with a fifth embodiment of the present invention.
Figure 9:
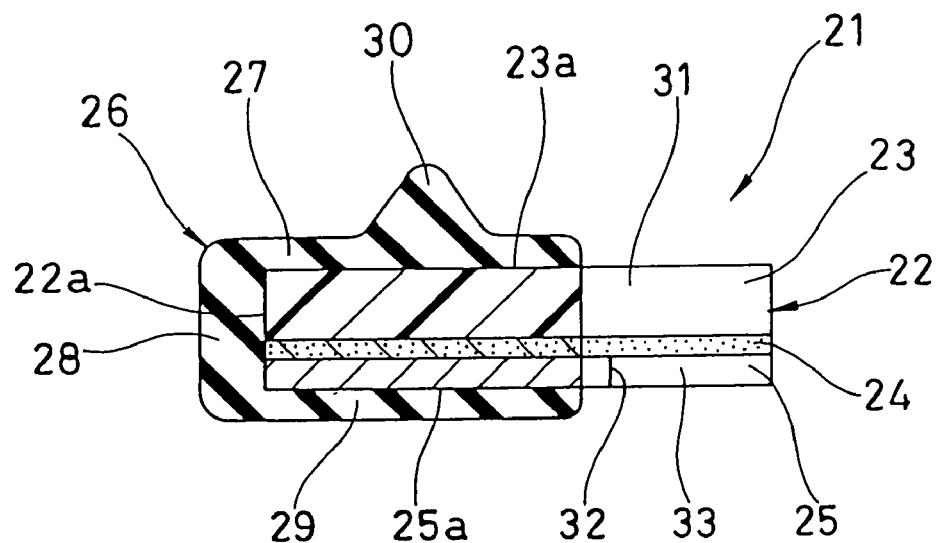
FIG. 9 is an enlarged cross sectional view along a line B-B in FIG. 8.
Figure 10:
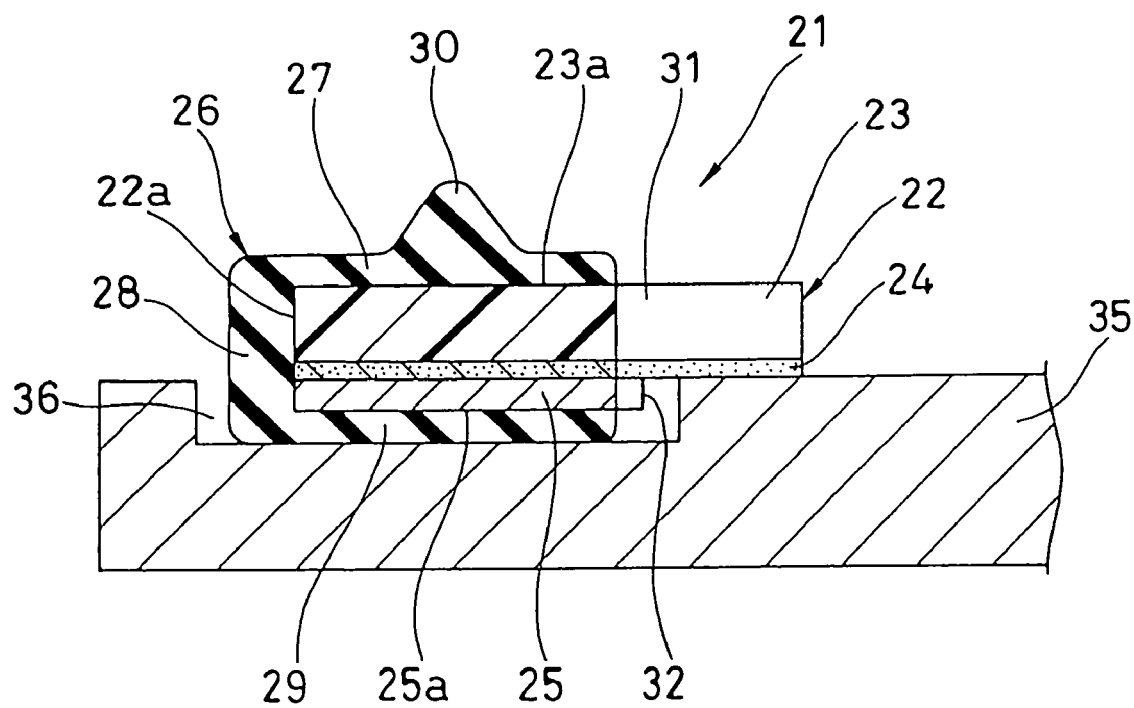
FIG. 10 is a cross sectional view of a main portion showing a state in which the gasket is attached.

In this case, in this fourth embodiment, as shown in the plan view in FIG. 5, the exposed portion 31 in the laminated film body 22 is provided in the entire periphery of the gasket 21, and the portion (the inner portion 33) on the plane of the mold releasing film 25, to which the mold releasing film side portion 29 is not applied and which is peeled at a time of the mounting work is provided all around the entire periphery of the gasket 21. However, in the case that the sticking area may be reduced, the structure can be made, as shown in FIGS. 8 to 10, such that the exposed portion 31 and the inner portion 33 are provided in a plurality positions on the periphery of the gasket 21 (a fifth embodiment). In accordance with this structure, since the sticking area can be further reduced, it is possible to make the positioning work and the sticking work including the positioning work easier. In a plan view in FIG. 8, the exposed portion 31 and the inner portion 33 are provided at six positions on the periphery of the gasket 21, and each of the exposed portion 31 is provided in an inward projection shape inward directed with respect to the main body portion of the film body 22 covered with the gasket main body 26. FIG. 9 is an enlarged cross sectional view along a line B-B in FIG. 8, and FIG. 10 is a cross sectional view showing an attaching state thereof. An enlarged cross section along a line C-C in FIG. 8 is the same shape as that in FIG. 6.

Sixth Embodiment

Figure 11:
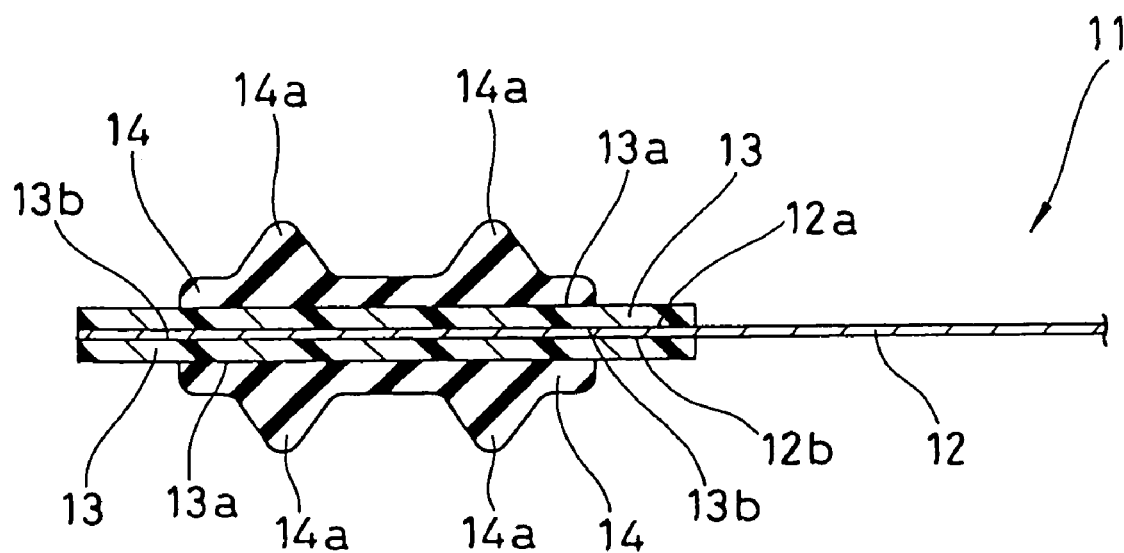
FIG. 11 is a cross sectional view of a main portion of a gasket in accordance with a sixth embodiment of the present invention.

FIG. 11 shows a cross section of a main portion (a cut end face) of a gasket 11 in accordance with a sixth embodiment of the present invention. This gasket 11 is used as a gasket for a fuel battery, and is structured as follows.

That is, first, one sheet of resin film 13 corresponding to the sheet-shaped gasket mounting member is provided in the upper side in the drawing of an electrolyte membrane (an ion exchange membrane) 12 in a reaction electrode portion (MEA) corresponding to the other end mounting member, and a gasket main body 14 made of a rubber elastic material is integrally formed on one face (the upper face in the drawing) 13a of the resin film 13 via an adhesive agent (not shown). Further, an adhesive agent (not shown) is applied to another face (the lower face in the drawing) 13b of the resin film 13, and the resin film 13 in which the gasket main body 14 is integrally formed is mounted to one face 12a of the electrolyte membrane 12 by this adhesive agent.

In a vertically symmetrical manner, one sheet of resin film 13 corresponding to the sheet-shaped gasket mounting member is provided in the lower side in the drawing of the electrolyte membrane 12 in the reaction electrode portion corresponding to the other end mounting member, and the gasket main body 14 made of the rubber elastic material is integrally formed on one face (the lower face in the drawing) 13a of the resin film 13 via an adhesive agent (not shown). Further, an adhesive agent (not shown) is applied to another face (the upper face in the drawing) 13b of the resin film 13, and the resin film 13 in which the gasket main body 14 is integrally formed is mounted to another face 12b of the electrolyte membrane 12 by this adhesive agent.

The gasket main body 14 arranged in the upper side of the drawing basically has a flat seal structure, and two bead-like seal lip portions 14a are integrally formed in parallel to each other on the upper face of the gasket main body 14 in the drawing. Further, the gasket main body 14 arranged in the lower side of the drawing basically has a flat seal structure, and two bead-like seal lip portions 14a are integrally formed in parallel to each other on the lower face of the gasket main body 14 in the drawing. The upper and lower gasket main bodies 14 are formed in mutually symmetrical shapes.

In accordance with the gasket 11 having the structure mentioned above, the same operations and effects as those of the gasket 1 in accordance with the first embodiment mentioned above can be achieved. Further, since two bead-like seal lip portions 14a are provided in each of the gasket main bodies 14 on both the faces of the electrolyte membrane 12, it is possible to prevent a surface pressure peak value of the gasket main body 14 from being lowered, even when positions at which the resin films 13 are stuck on both the faces are slightly displaced to the right or left side in the drawing.

In this case, in this embodiment, in place of the structure that the gasket main body 14 is integrally formed on one face 13a of the resin film 13 via the adhesive agent, the adhesive rubber may be integrally formed directly without applying the adhesive agent, as mentioned above. Further, the structure may be made such that the gasket main body 14 which is previously formed in the product shape independently is bonded to one face 13a of the resin film 13 by the adhesive agent.

Seventh Embodiment

Figure 12:
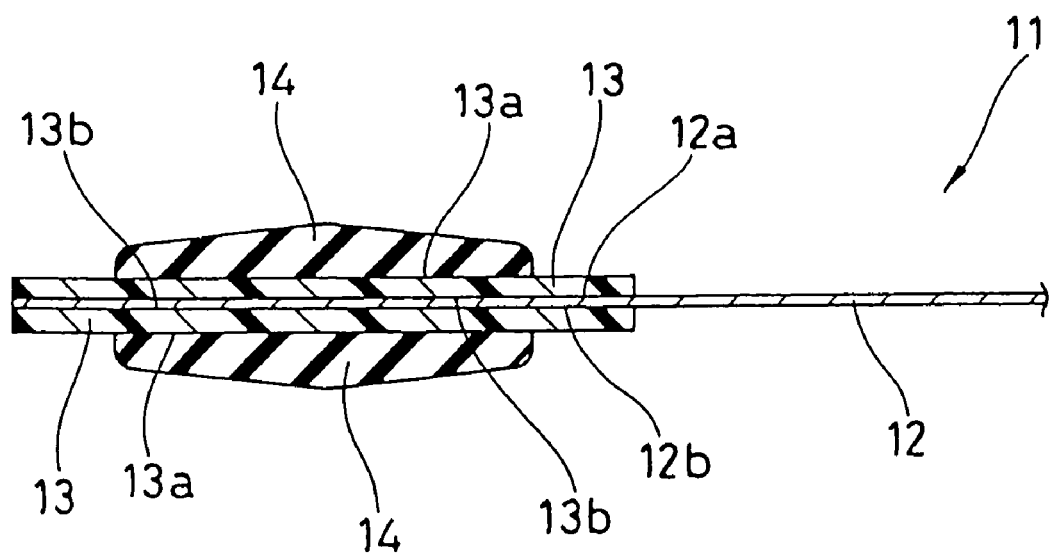
FIG. 12 is a cross sectional view of a main portion of a gasket in accordance with a seventh embodiment of the present invention.

FIG. 12 shows a cross section of a main portion (a cut end face) of a gasket 11 in accordance with a seventh embodiment of the present invention. This gasket 11 is used as a gasket for a fuel battery, and is structured as follows.

That is, first, one sheet of resin film 13 corresponding to the sheet-shaped gasket mounting member is provided in the upper side in the drawing of an electrolyte membrane (an ion exchange membrane) 12 in a reaction electrode portion (MEA) corresponding to the other end mounting member, and a gasket main body 14 made of a rubber elastic material is integrally formed on one face (the upper face in the drawing) 13a of the resin film 13 via an adhesive agent (not shown). Further, an adhesive agent (not shown) is applied to another face (the lower face in the drawing) 13b of the resin film 13, and the resin film 13 in which the gasket main body 14 is integrally formed is mounted to one face 12a of the electrolyte membrane 12 by this adhesive agent.

In a vertically symmetrical manner, one sheet of resin film 13 corresponding to the sheet-shaped gasket mounting member is provided in the lower side in the drawing of the electrolyte membrane 12 in the reaction electrode portion corresponding to the other end mounting member, and the gasket main body 14 made of the rubber elastic material is integrally formed on one face (the lower face in the drawing) 13a of the resin film 13 via an adhesive agent (not shown). Further, an adhesive agent (not shown) is applied to another face (the upper face in the drawing) 13b of the resin film 13, and the resin film 13 in which the gasket main body 14 is integrally formed is mounted to another face 12b of the electrolyte membrane 12 by this adhesive agent.

The gasket main body 14 arranged in the upper side of the drawing basically has a flat seal structure, and any bead-like seal lip is not formed on the upper face of the gasket main body 14 in the drawing, but the upper face is formed in a gentle angular shape so as to make the surface pressure peak large. Further, the gasket main body 14 arranged in the lower side of the drawing basically has a flat seal structure, and any bead-like seal lip is not formed on the lower face of the gasket main body 14 in the drawing, but the lower face is formed in a gentle angular shape so as to make the surface pressure peak large. The upper and lower gasket main bodies 14 are formed in mutually symmetrical shapes.

In accordance with the gasket 11 having the structure mentioned above, the same operations and effects as those of the gasket 1 in accordance with the first embodiment mentioned above can be achieved. Further, since each of the gasket main bodies 14 is formed in the gentle angular shape without arranging the bead-like seal lip in each of the gasket main bodies 14 on both the faces of the electrolyte membrane 12, it is possible to prevent a surface pressure peak value of the gasket main body 14 from being lowered, even when positions at which the resin films 13 are stuck on both the faces are slightly displaced to the right or left side in the drawing.

In this case, in this embodiment, in place of the structure that the gasket main body 14 is integrally formed on one face 13a of the resin film 13 via the adhesive agent, the adhesive rubber may be integrally formed directly without applying the adhesive agent, as mentioned above. Further, the structure may be made such that the gasket main body 14 which is previously formed in the product shape independently is bonded to one face 13a of the resin film 13 by the adhesive agent.

Eighth Embodiment

Figure 13:
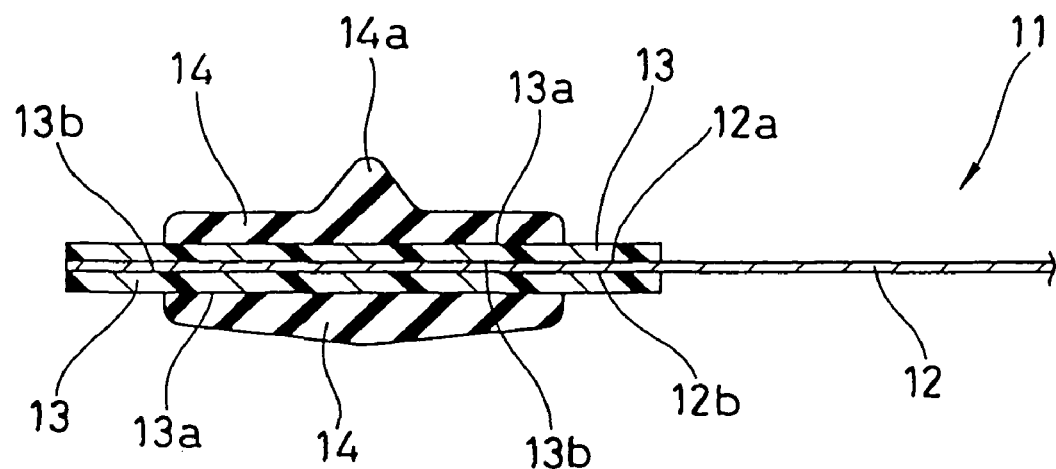
FIG. 13 is a cross sectional view of a main portion of a gasket in accordance with an eighth embodiment of the present invention.

FIG. 13 shows a cross section of a main portion (a cut end face) of a gasket 11 in accordance with an eighth embodiment of the present invention. This gasket 11 is used as a gasket for a fuel battery, and is structured as follows.

That is, first, one sheet of resin film 13 corresponding to the sheet-shaped gasket mounting member is provided in the upper side in the drawing of an electrolyte membrane (an ion exchange membrane) 12 in a reaction electrode portion (MEA) corresponding to the other end mounting member, and a gasket main body 14 made of a rubber elastic material is integrally formed on one face (the upper face in the drawing) 13a of the resin film 13 via an adhesive agent (not shown). Further, an adhesive agent (not shown) is applied to another face (the lower face in the drawing) 13b of the resin film 13, and the resin film 13 in which the gasket main body 14 is integrally formed is mounted to one face 12*a* of the electrolyte membrane 12 by this adhesive agent.

In a vertically symmetrical manner, one sheet of resin film 13 corresponding to the sheet-shaped gasket mounting member is provided in the lower side in the drawing of the electrolyte membrane 12 in the reaction electrode portion corresponding to the other end mounting member, and the gasket main body 14 made of the rubber elastic material is integrally formed on one face (the lower face in the drawing) 13*a* of the resin film 13 via an adhesive agent (not shown). Further, an adhesive agent (not shown) is applied to another face (the upper face in the drawing) 13*b* of the resin film 13, and the resin film 13 in which the gasket main body 14 is integrally formed is mounted to another face 12*b* of the electrolyte membrane 12 by this adhesive agent.

The gasket main body 14 arranged in the upper side of the drawing basically has a flat seal structure, and one bead-like seal lip portion 14*a* is integrally formed on the upper face of the gasket main body 14 in the drawing. Further, the gasket main body 14 arranged in the lower side of the drawing basically has a flat seal structure, and any bead-like seal lip is not provided on the lower face of the gasket main body 14 in the drawing, but the lower face is formed in a gentle angular shape so as to make a surface pressure peak large. The upper and lower gasket main bodies 14 are formed in mutually asymmetrical shapes.

In accordance with the gasket 11 having the structure mentioned above, the same operations and effects as those of the gasket 1 for the fuel battery in accordance with the first embodiment mentioned above can be achieved. Further, since one bead-like seal lip portion 14*a* is provided in the gasket main body 14 in the side of one face 12*a* of the electrolyte membrane 12, and in the gasket main body 14 in the side of another face 12*b*, no bead-like seal lip is provided and the gasket main body 14 is formed in the gentle angular shape, it is possible to prevent a surface pressure peak value of the gasket main body 14 from being lowered, even when positions at which the resin films 13 are stuck on both the faces are slightly displaced to the right or left side in the drawing.

In this case, in this embodiment, in place of the structure that the gasket main body 14 is integrally formed on one face 13*a* of the resin film 13 via the adhesive agent, the adhesive rubber may be integrally formed directly without applying the adhesive agent, as mentioned above. Further, the structure may be made such that the gasket main body 14 which is previously formed in the product shape independently is bonded to one face 13*a* of the resin film 13 by the adhesive agent.

Ninth Embodiment

Figure 14:
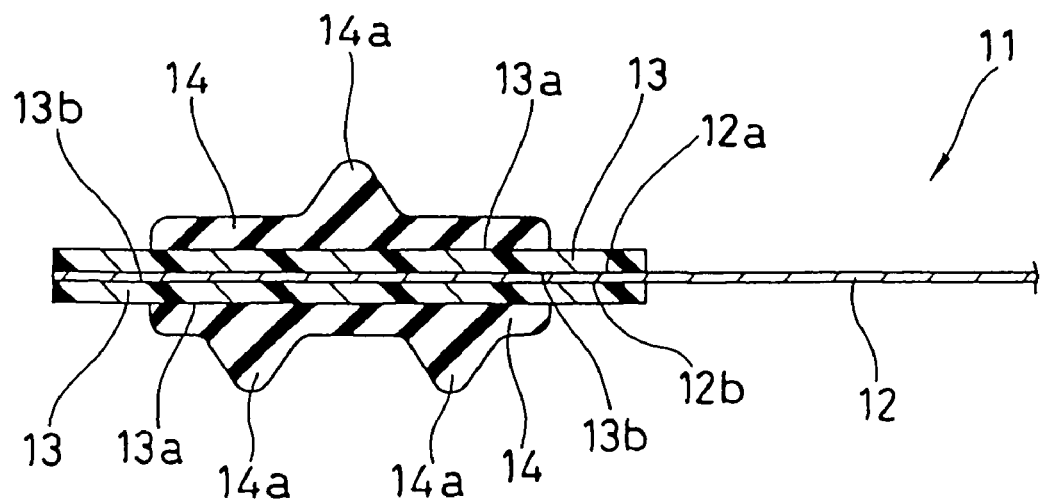
FIG. 14 is a cross sectional view of a main portion of a gasket in accordance with a ninth embodiment of the present invention.

FIG. 14 shows a cross section of a main portion (a cut end face) of a gasket 11 in accordance with a ninth embodiment of the present invention. This gasket 11 is used as a gasket for a fuel battery, and is structured as follows.

That is, first, one sheet of resin film 13 corresponding to the sheet-shaped gasket mounting member is provided in the upper side in the drawing of an electrolyte membrane (an ion exchange membrane) 12 in a reaction electrode portion (MEA) corresponding to the other end mounting member, and a gasket main body 14 made of a rubber elastic material is integrally formed on one face (an upper face in the drawing) 13*a* of the resin film 13 via an adhesive agent (not shown). Further, an adhesive agent (not shown) is applied to another face (a lower face in the drawing) 13*b* of the resin film 13, and the resin film 13 in which the gasket main body 14 is integrally formed is mounted to one face 12*a* of the electrolyte membrane 12 by this adhesive agent.

In a vertically symmetrical manner, one sheet of resin film 13 corresponding to the sheet-shaped gasket mounting member is provided in a lower side in the drawing of the electrolyte membrane 12 in the reaction electrode portion corresponding to the other end mounting member, and the gasket main body 14 made of the rubber elastic material is integrally formed on one face (the lower face in the drawing) 13*a* of the resin film 13 via an adhesive agent (not shown). Further, an adhesive agent (not shown) is applied to another face (the upper face in the drawing) 13*b* of the resin film 13, and the resin film 13 in which the gasket main body 14 is integrally formed is mounted to another face 12*b* of the electrolyte membrane 12 by this adhesive agent.

The gasket main body 14 arranged in the upper side of the drawing basically has a flat seal structure, and one bead-like seal lip portion 14*a* is integrally formed on an upper face of the gasket main body 14 in the drawing. Further, the gasket main body 14 arranged in the lower side of the drawing basically has a flat seal structure, and two bead-like seal lip portions 14*a* are integrally formed in parallel to each other on the lower face of the gasket main body 14 in the drawing. The upper and lower gasket main bodies 14 are formed in mutually asymmetrical shapes.

In accordance with the gasket 11 having the structure mentioned above, the same operations and effects as those of the gasket 1 in accordance with the first embodiment mentioned above can be achieved. Further, since one bead-like seal lip portion 14*a* is provided in the gasket main body 14 in the side of one face 12*a* of the electrolyte membrane 12 and two bead-like seal lip portions 14*a* are provided in the gasket main body 14 in the side of another face 12*b*, it is possible to prevent a surface pressure peak value of the gasket main body 14 from being lowered, even when positions at which the resin films 13 are stuck on both the faces are slightly displaced to the right or left side in the drawing.

In this case, in this embodiment, in place of the structure that the gasket main body 14 is integrally formed on one face 13*a* of the resin film 13 via the adhesive agent, the adhesive rubber may be integrally formed directly without applying the adhesive agent, as mentioned above. Further, the structure may be made such that the gasket main body 14 which is previously formed in the product shape independently is bonded to one face 13*a* of the resin film 13 by the adhesive agent.

Tenth Embodiment

Figure 15:
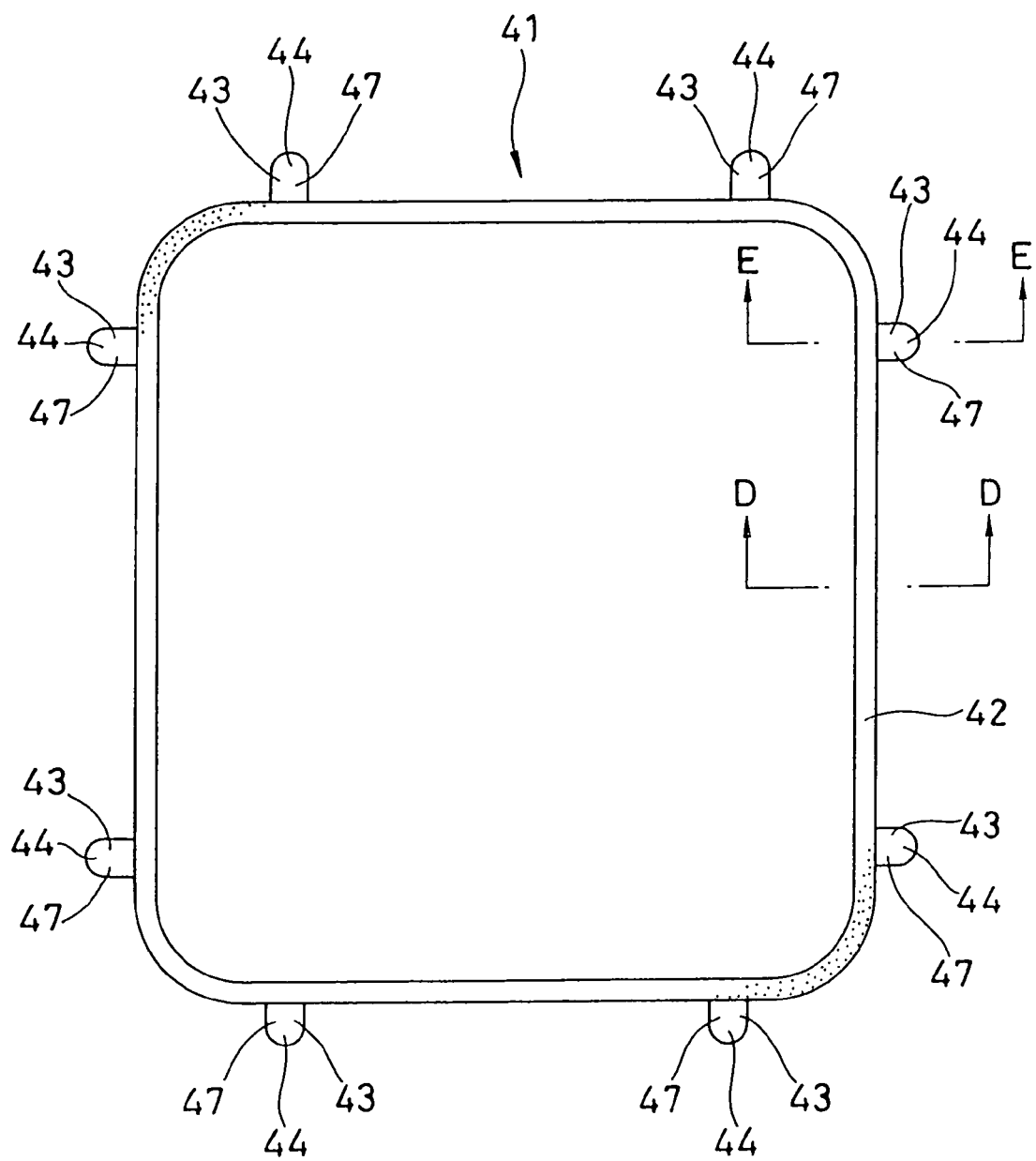
FIG. 15 is a plan view of a gasket in accordance with a tenth embodiment of the present invention.
Figure 16:
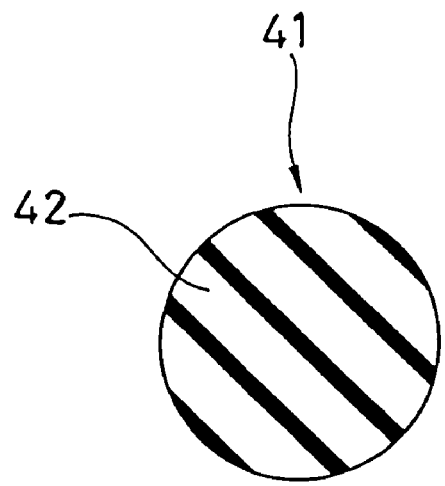
FIG. 16 is an enlarged cross sectional view along a line D-D in FIG. 15.
Figure 17:
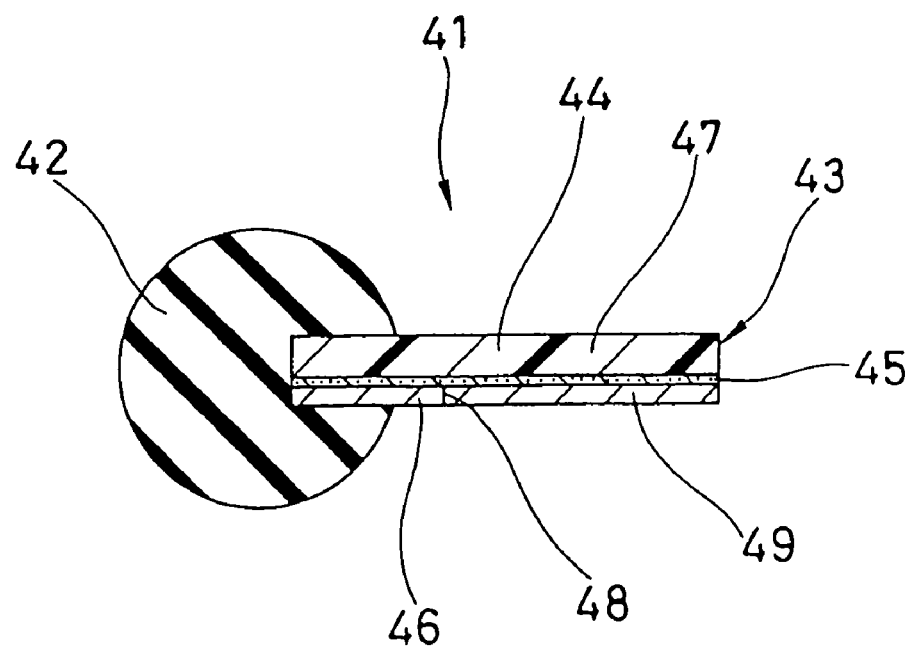
FIG. 17 is an enlarged cross sectional view along a line E-E in FIG. 15.

FIG. 15 shows a plan view of a gasket 41 in accordance with a tenth embodiment of the present invention, an enlarged cross section along a line D-D (a cut end face) of the gasket is shown in FIG. 16, and an enlarged cross section along a line E-E (a cut end face) of the gasket is shown in FIG. 17. The gasket 41 is used as a gasket for a fuel battery, and is structured as follows.

That is, first, the gasket is provided with a gasket main body 42 constituted in a rubber-only type and made of a rubber elastic material, and resin films 44 corresponding to the sheet-shaped gasket mounting member are mounted to a plurality of positions on a periphery of the gasket main body 42. An adhesive agent 45 is applied to one face (the lower face in FIG. 17) of each of the resin films 44, a mold releasing film 46 is attached to the adhesive agent 45 so as to be freely peeled, a laminated film body 43 constituted by a three-layer structure as above is provided, and the film body 43 is integrated with the gasket main body 42 mentioned above in accordance with a bonding means such as an insert molding, a boding, a fitting or the like. A plurality of resin films 44 or the film bodies 43 are arranged on the same plane with each other.

The gasket main body 42 made of the rubber elastic material is formed in a predetermined plane layout in correspondence to a plane shape of the fuel battery and is formed in an endless shape. Further, the gasket main body 42 is formed in an O-ring shape having a circular cross section, and each of the film bodies 43 is arranged in an approximately center position in the height direction in an outer peripheral portion of the gasket main body 42. As mentioned above, since each of the film bodies 43 is arranged in the approximately center in the height direction of the gasket main body 42, the gasket 41 structures a both-face gasket.

The laminated film body 43 is not covered with the gasket main body 42 in all areas, but an outer portion (a right portion in FIG. 17) thereof is exposed from the gasket main body 42, and a slit portion 48 is provided in the mold releasing film 46 in this exposed portion 47. Accordingly, the mold releasing film 46 is structured such that an outer portion 49 than the slit portion 48 is peeled by gripping and pulling the outer portion 49 by fingers, and the adhesive agent 45 existing in the inner face thereof is exposed in this peeled portion. Therefore, the gasket 41 can be mounted to a predetermined portion of the other end mounting member on the basis of an adhesion effect or a sticking function of the exposed adhesive agent 45.

Figure 18:
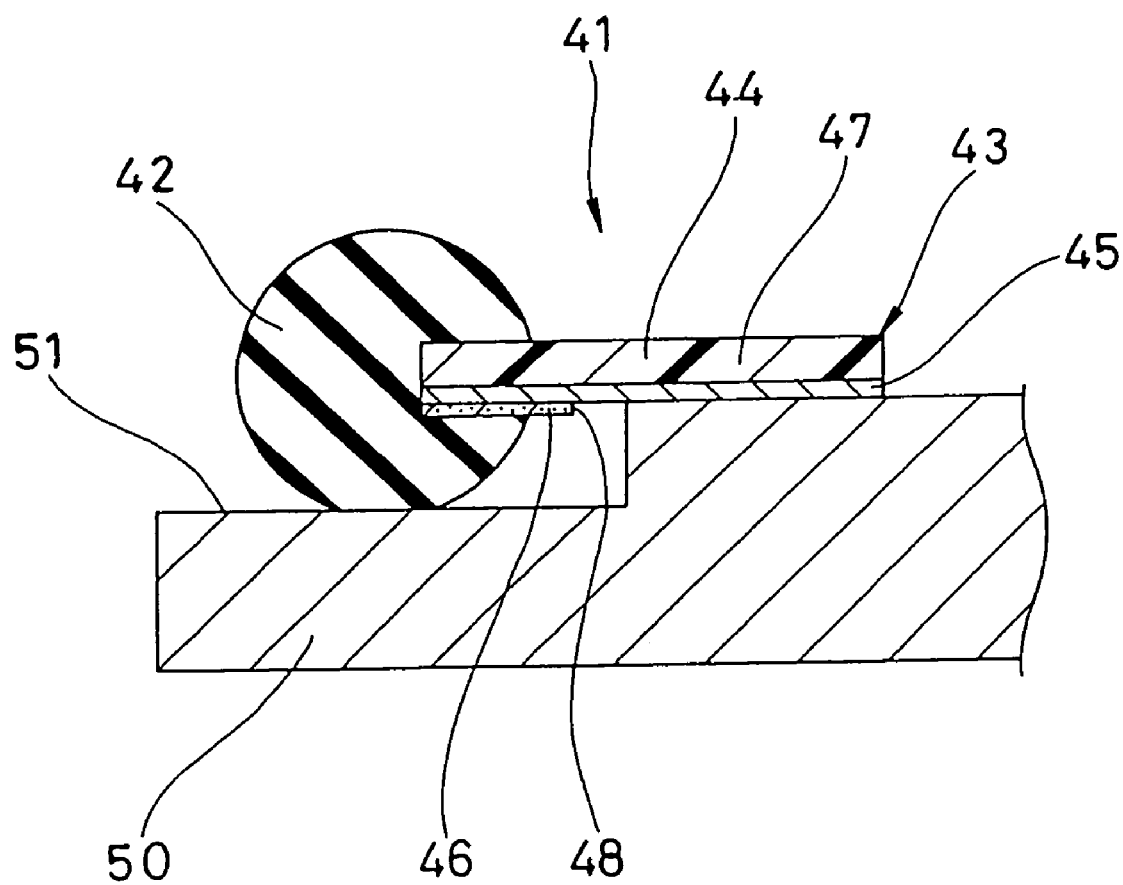
FIG. 18 is a cross sectional view of a main portion showing a state in which the gasket is attached.

FIG. 18 shows a mounting state of the gasket, and a step-like gasket attaching portion 51 is previously provided on one face of the separator 50 corresponding to the other end mounting member so as to be aligned in height. Accordingly, at a time of mounting the gasket 41 to the separator 50, the outer portion 49 of the mold releasing film 46 is peeled from the film body 43 as mentioned above, the gasket main body 42 is positioned with respect to the gasket attaching portion 51, and the exposed portion 47 of the film body 43 is pressed to the separator 50.

In accordance with the gasket 41 having the structure mentioned above, the same operations and effects as those of the gasket 1 in accordance with the first embodiment can be achieved. In addition, since the structure is made such that the gasket 41 is mounted to the separator 50 on the basis of the sticking function of the adhesive agent 45 applied to the lower face of the resin film 44, it is possible to mount the gasket 41 to the separator 50 by a simple work only of positioning the gasket 41 and pressing the exposed portion 47 of each of the film bodies 43.

Further, since the both-face gasket is structured by the gasket main body 41 formed in the O-ring shape having the circular cross section, the gasket main body 42 is in direct contact with the separator 50, so that it is possible to effectively seal between the film body 43 and the separator 50. Accordingly, it is possible to obtain a high sealing performance without depending on a material, a surface roughness or the like of the separator 50, and a high sealing performance can be obtained even in the case that a sealing effect is small only by the adhesive agent 45.

Figure 19:
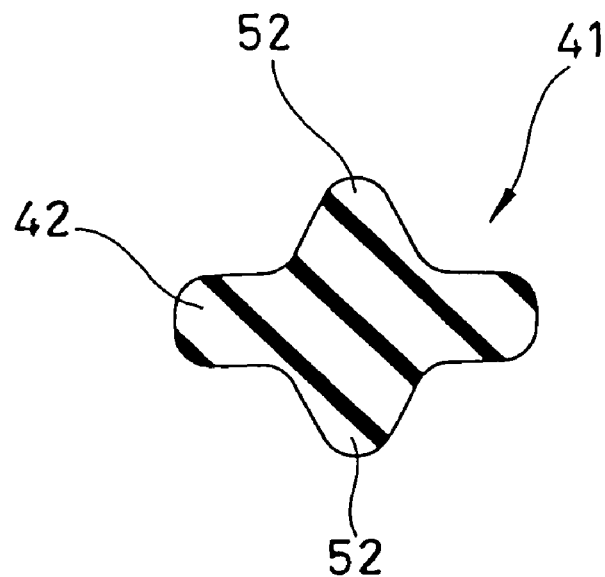
FIG. 19 is a cross sectional view of a main portion of a gasket in accordance with an eleventh embodiment of the present invention.
Figure 20:
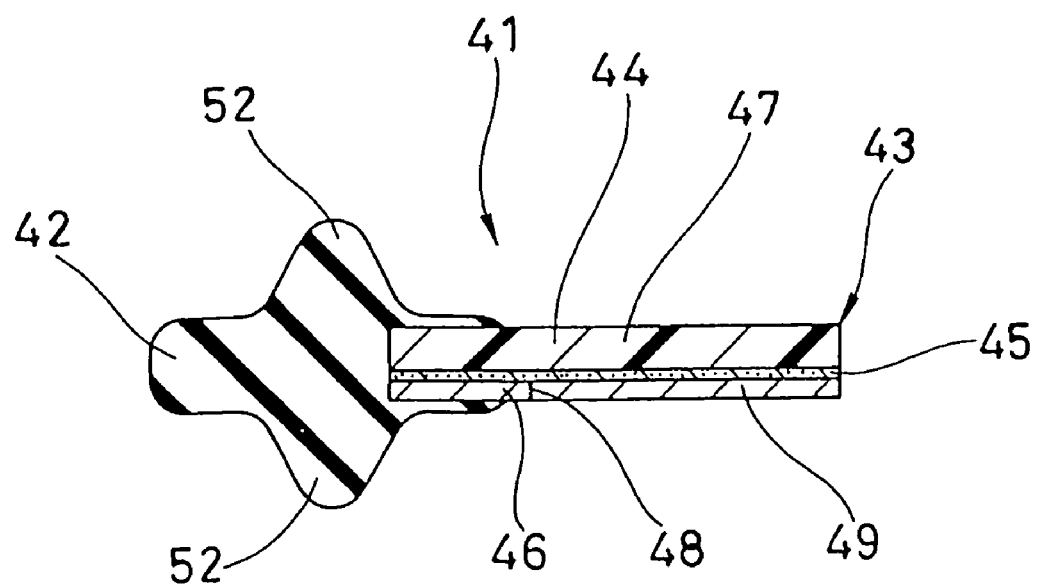
FIG. 20 is a cross sectional view of a main portion of the gasket.
Figure 21:
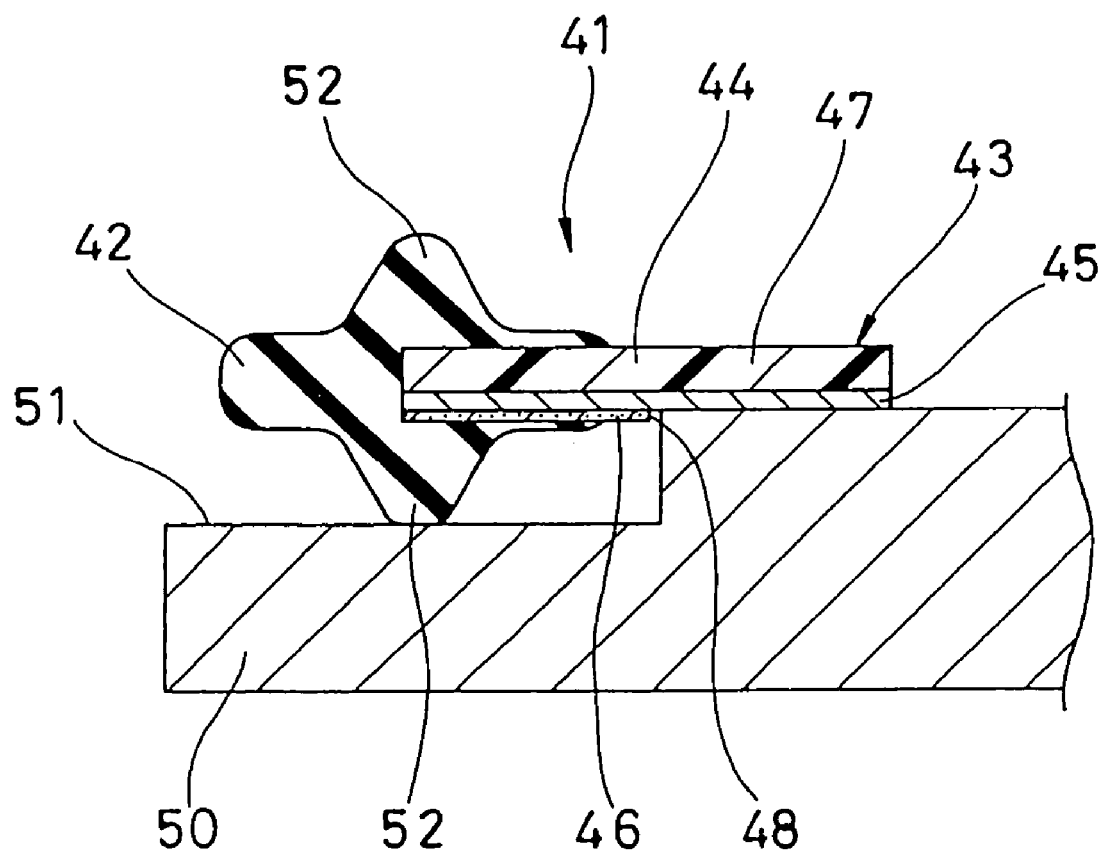
FIG. 21 is a cross sectional view of a main portion showing a state in which the gasket is attached.

In this case, in this tenth embodiment, the cross sectional shape of the gasket main body 42 is formed in the O-ring shape having the circular cross section, however, this cross sectional shape may be a lip shape as shown in FIGS. 19 to 21, and in the illustrated embodiment, a seal lip portion 52 is integrally formed in each of upper and lower faces of the gasket main body 42 (an eleventh embodiment).

Figure 22:
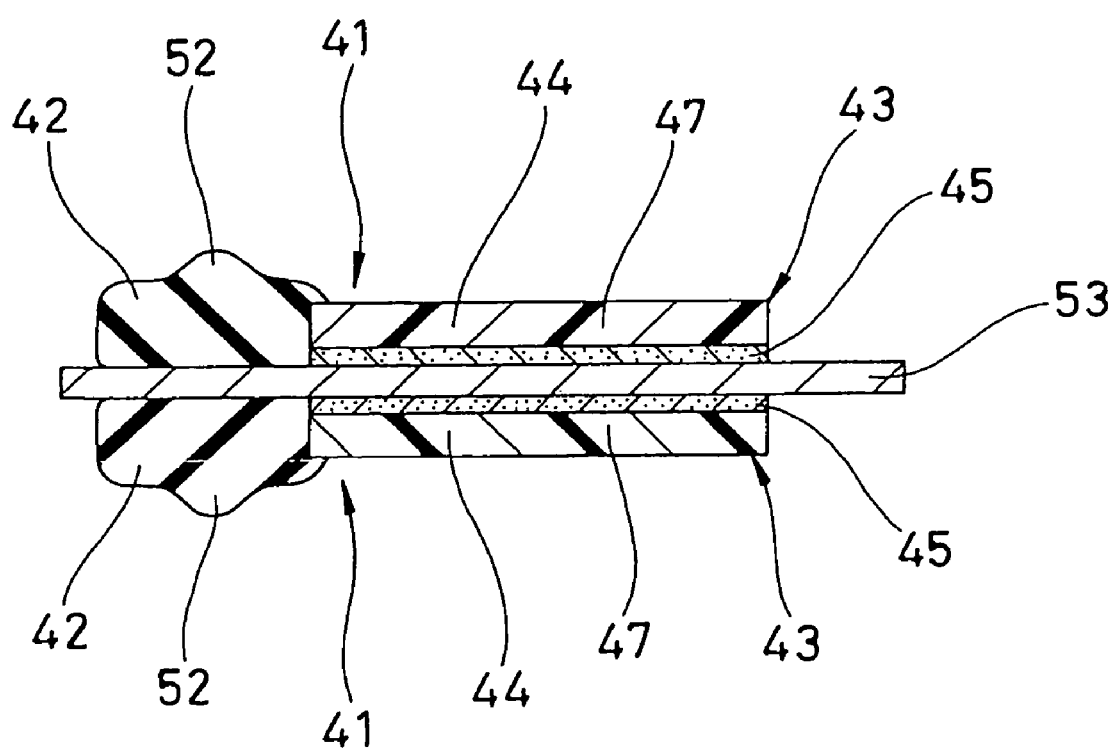
FIG. 22 is a cross sectional view of a main portion of a gasket in accordance with a twelfth embodiment of the present invention.

Further, the other end mounting member may be an electrolyte membrane (an ion exchange membrane) 53 in a reaction electrode portion as shown in FIG. 22, and in this case, the gasket 41 is mounted to each of both upper and lower faces of the electrolyte membrane (a twelfth embodiment).

Thirteenth Embodiment

Figure 23:
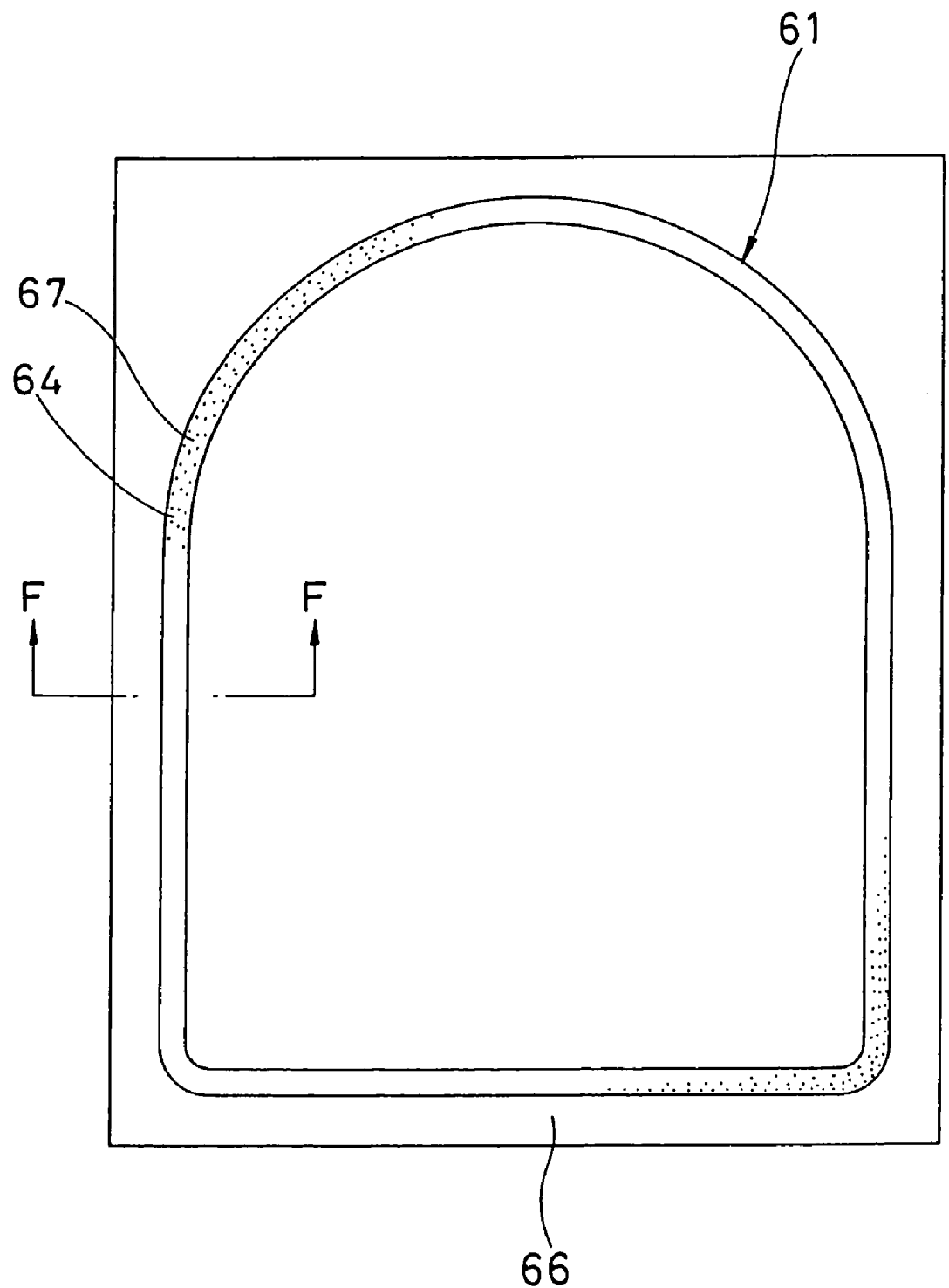
FIG. 23 is a plan view of a gasket in accordance with a thirteenth embodiment of the present invention.
Figure 24:
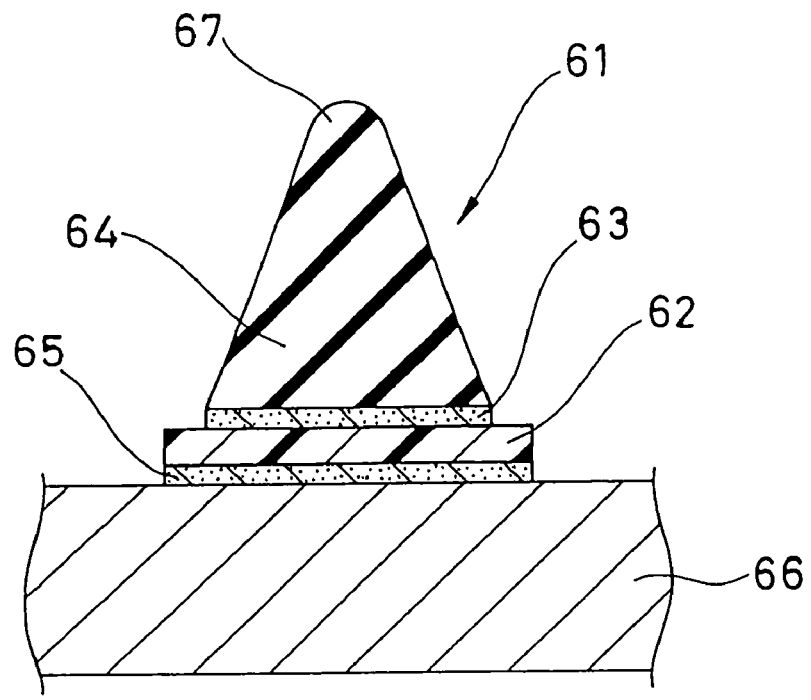
FIG. 24 is an enlarged cross sectional view along a line F-F in FIG. 23.

FIG. 23 shows a plan view of a gasket 61 in accordance with a thirteenth embodiment of the present invention, and an enlarged cross section (a cut end face) along a line F-F of the gasket is shown in FIG. 24. The gasket 61 is used as a gasket for a top cover in the HDD, and is structured as follows.

That is, first, the gasket is provided with a resin film 62 corresponding to a sheet-shaped gasket mounting member, and a gasket main body 64 made of a rubber elastic material is integrally formed on one face (the upper face in FIG. 24) of the resin film 62 via an adhesive agent 63. Further, an adhesive agent (called also as an adhesive compound) 65 is applied to another face (a lower face in FIG. 24) of the resin film 64, and the resin film 62 in which the gasket main body 64 is integrally formed is mounted to one face of a top cover 66 as the other end mounting member by the adhesive agent 65. The gasket main body 64 is formed in an approximately triangular shape in a cross section, and a top portion of the gasket main body is formed as a seal lip portion 67.

At a time of manufacturing the gasket 61 having the structure mentioned above, an injection molding is carried out in a state in which the resin film 62 in which the adhesive agent 63 is previously applied to one face is attached to a molding die for injection molding the gasket main body 64, and the gasket main body 64 is bonded to one face of the resin film 62 at the same time of the molding (an insert molding). Next, an integrally formed product constituted by the resin film 62 and the gasket main body 64 is taken out from the molding die, the adhesive agent 65 is applied to another face of the resin film 62, and the integrally formed product is bonded to one face of the top cover 66 by the adhesive agent 65.

In accordance with the gasket 61 having the structure mentioned above, the following operations and effects can be achieved.

That is, first, the integrally formed product of the gasket 61 constituted by the resin film 62 and the gasket main body 64 is manufactured on the basis of the structure mentioned above, and in this integrally formed product, the resin film 62 serves as a reinforcing member with respect to the gasket main body 64. Accordingly, since a shape retaining property of the gasket 61 is improved in comparison with the product constituted by a rubber elementary substance, and the gasket 61 is hard to be deformed as a whole, it is possible to improve a handling property of the gasket 61.

Further, since the gasket main body 64 is integrally formed with the resin film 62 and is later bonded to the top cover 66 via the resin film 62, it is not necessary to attach the top cover 66 to the molding die at a time of molding the gasket main body 64. Accordingly, since there is no risk that a crack or the like is generated even in the case that the top cover 66 is made of a material having a low strength or a thin plate, it is possible to easily integrate the top cover 66 with the gasket 61.

Further, since the resin film 62 attached to the molding die in place of the top cover 66 has no fear that the crack or the like is generated, it is possible to largely set a mold clamping force at a time of molding. Accordingly, it is possible to prevent a lot of rubber burrs from being generated at a time of molding.

Further, since the structure is made such that the gasket 61 is mounted to the top cover 66 corresponding to the other end mounting member in accordance with a sticking function achieved by the adhesive agent 65 provided on another face of the resin film 62, the gasket 61 can be mounted to the top cover 66 in accordance with a simple work obtained only by positioning and pressing the gasket 61.

Figure 25:
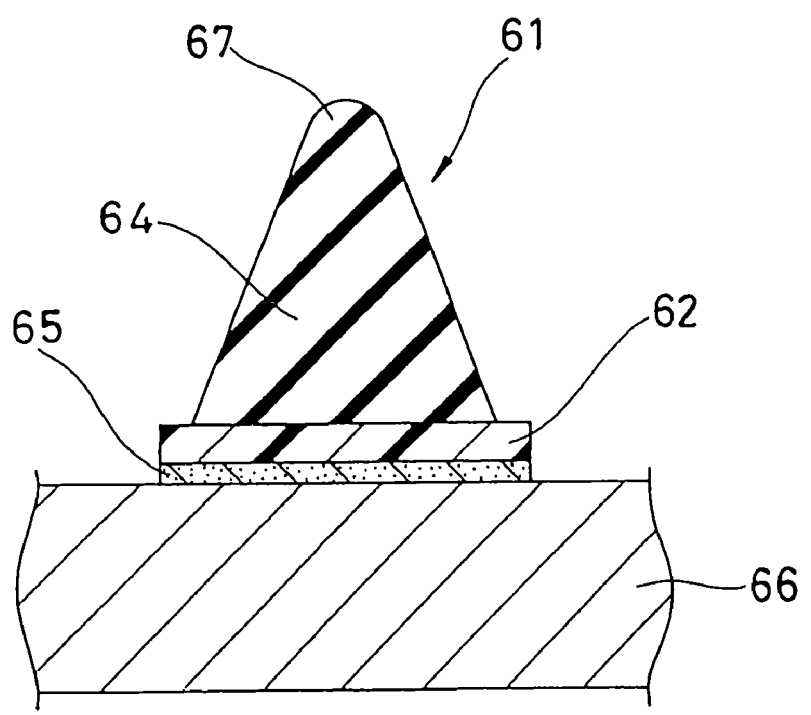
FIG. 25 is a cross sectional view of a main portion of a gasket in accordance with a fourteenth embodiment of the present invention.

In this case, in the embodiment mentioned above, in place of the structure that the gasket main body 64 is integrally formed on one face of the resin film 62 via the adhesive agent 63, the adhesive rubber may be integrally formed directly without applying the adhesive agent 63, as mentioned above. FIG. 25 shows one embodiment of the structure (a fourteenth embodiment) Further, the gasket main body 64 which is previously formed in the product shape independently may be bonded to one face of the resin film 62 by the adhesive agent 65.

Fifteenth Embodiment

Figure 26:
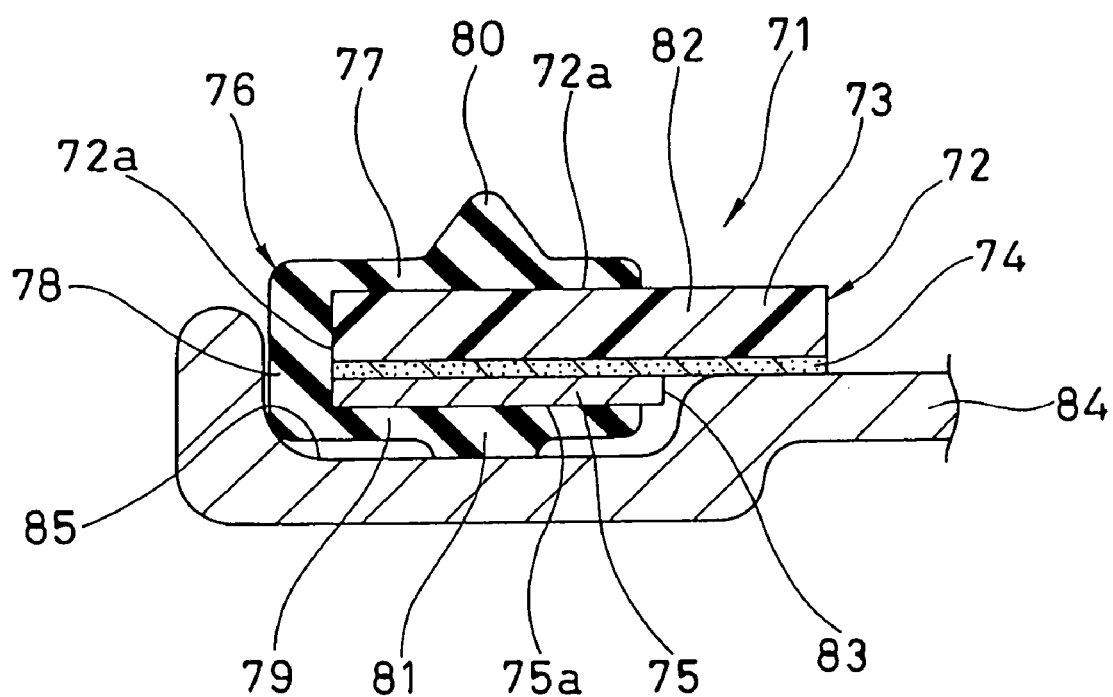
FIG. 26 is a cross sectional view of a main portion of a gasket in accordance with a fifteenth embodiment of the present invention.

FIG. 26 shows a cross section (a cut end face) of a main portion of a gasket 71 in accordance with a fifteenth embodiment of the present invention. The gasket 71 is used as a gasket for a top cover in the HDD, and is structured as follows.

That is, first, an adhesive agent (called also as an adhesive compound) 74 is attached to one face (the lower face in the drawing) of a resin film 73 corresponding to a sheet-shaped gasket mounting member, a mold releasing film 75 is attached to the adhesive agent 74 so as to be freely peeled, a laminated film body 72 constituted by a three-layer structure as above is provided, and a gasket main body 76 made of a rubber elastic material is integrated with the film body 72 in accordance with a bonding means such as an insert molding, a boding, a fitting or the like. The resin film 73 is formed in a predetermined plane layout in conformity with a plane shape of the top cover and is formed in an endless shape, and is further formed in a shape having a uniform width all around an entire periphery. The adhesive agent 74 is attached to one face of the resin film 73 all around an entire surface, and the mold releasing film 75 is formed in the same plane shape as that of the resin film 73.

The gasket main body 76 made of the rubber elastic material integrally has a resin film side portion 77 attached to a part of a plane (the upper face in the drawing) 73a of the resin film 73 in the film body 72 mentioned above, an end face side portion 78 attached to an outer end face (an outer side face, the left end face or the left side face in the drawing) 72a of the film body 72, and a mold releasing film side portion 79 attached to a part of a plane (the lower face in the drawing) 75a of the mold releasing film 75, and is formed in an approximately C shape in a cross section. The resin film side portion 77 forms an upper face seal portion, and a seal lip portion 80 having an approximately triangular shape in a cross section is provided in this portion 77. The mold releasing film side portion 79 forms a lower face seal portion, and this portion 79 is also provided with a seal lip portion 81 having an approximately triangular shape in a cross section. Both the portions 77 and 79 form a pair of the upper and lower sides, and form a both-face gasket.

The laminated film body 72 is not entirely covered with the gasket main body 76, an inner portion (a right portion in the drawing) thereof is exposed all around an entire periphery, and a slit portion 83 is provided in the mold releasing film 75 in an exposed portion 82 all around an entire periphery. Accordingly, the mold releasing film 75 is structured such that an inner portion (which is not shown, and is already peeled in the drawing showing an attached state) than the slit portion 83 is peeled by gripping and pulling the inner portion by fingers, and the adhesive agent 74 existing in an inner face thereof is exposed in this peeled portion. Therefore, the gasket 71 can be to a predetermined portion of the other end mounting member on the basis of an adhesion effect or a sticking function of the exposed adhesive agent 74.

FIG. 26 shows a mounting state of the gasket 71, and a groove-like gasket attaching portion 85 is previously provided on one face of the top cover 84 corresponding to the other end mounting member so as to be aligned in height. Accordingly, at a time of mounting the gasket 71 to the top cover 84, the inner portion of the mold releasing film 75 is peeled from the film body 72 as mentioned above, the mold releasing film side portion 79 of the gasket main body 76 is fitted to the attaching portion 85 so as to be positioned, and the exposed portion 82 of the film body 72 is pressed to the top cover 84.

In accordance with the gasket 71 having the structure mentioned above, the same operations and effects as those of the gasket 1 in accordance with the first embodiment can be achieved. In addition, since the both-face gasket is formed in the gasket main body 76 made of the rubber elastic material, and in particular, the mold releasing film side portion 79 is formed in the top cover 66 corresponding to the other end mounting member as one of both the faces so as to be in direct contact with the top cover 66, it is possible to effectively seal between the film body 72 and the top cover 84 by this mold releasing film side portion 79. Accordingly, it is possible to obtain a high sealing performance without depending on a material, a surface roughness or the like of the top cover 84, and a high sealing performance can be obtained even in the case that a sealing effect is small only by the adhesive agent 74.

Further, since the structure is made such that the mounting to the top cover 84 is achieved not by the entire plane of the adhesive agent 74 applied to the entire face of the lower face of the resin film 73 but by the partial plane, the sticking area is comparatively small, so that it is possible to make a positioning work at a time of sticking the gasket 71 to the top cover 84 easy.

Further, since the structure is made such that the gasket 71 is mounted to the top cover 84 corresponding to the other end mounting member on the basis of the sticking function obtained by the adhesive agent 74 applied to the lower face of the resin film 73, it is possible to mount the gasket 71 to the top cover 84 on the basis of a simple work only of positioning the gasket 71 and pressing the exposed portion 82 of the film body 72.

Figure 27:
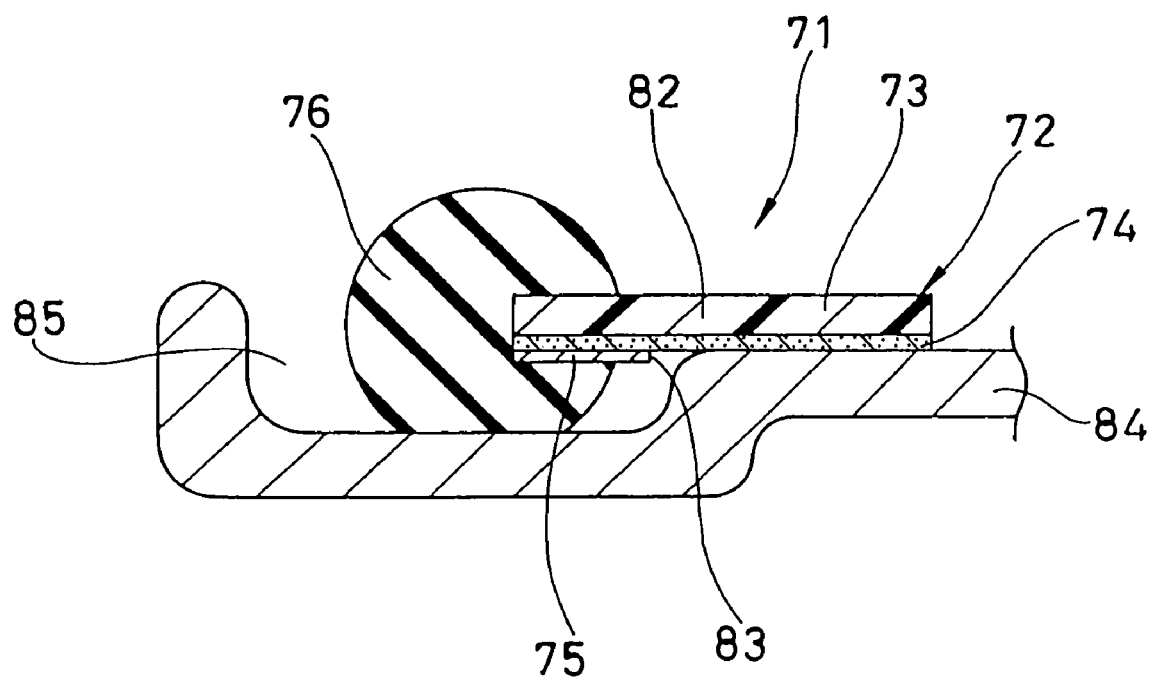
FIG. 27 is a cross sectional view of a main portion of a gasket in accordance with a sixteenth embodiment of the present invention.
Figure 28:
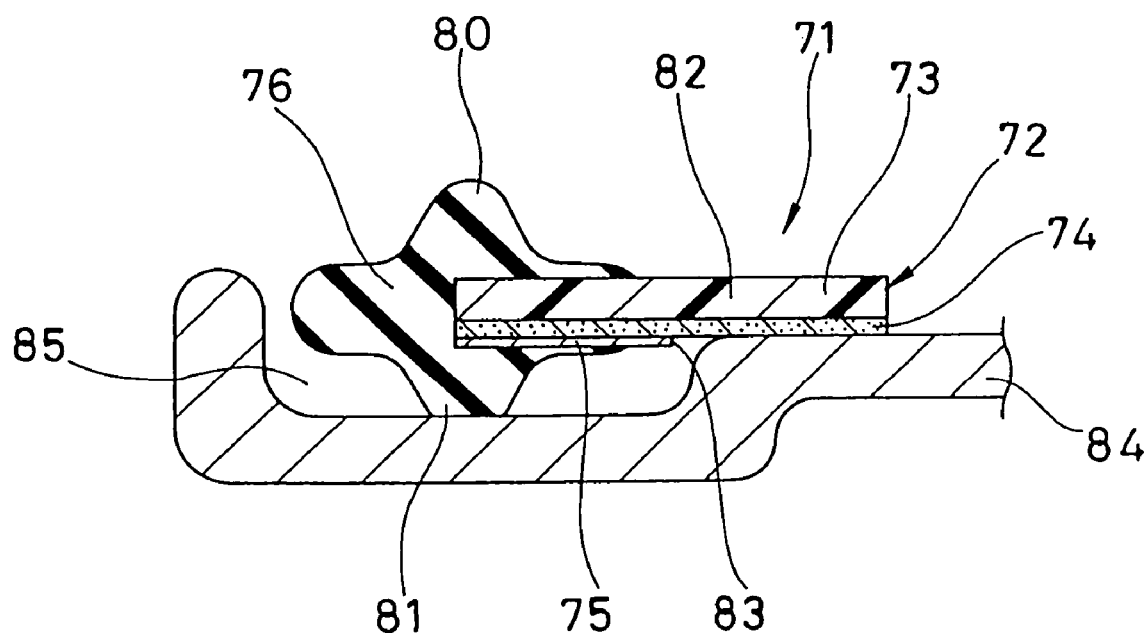
FIG. 28 is a cross sectional view of a main portion of a gasket in accordance with a seventeenth embodiment of the present invention.

In this case, the cross sectional shape of the gasket main body 76 may be an O-ring shape (a sixteenth embodiment) as shown in FIG. 27, or a lip shape (a seventeenth embodiment) as shown in FIG. 28.

Eighteenth Embodiment

Figure 29:
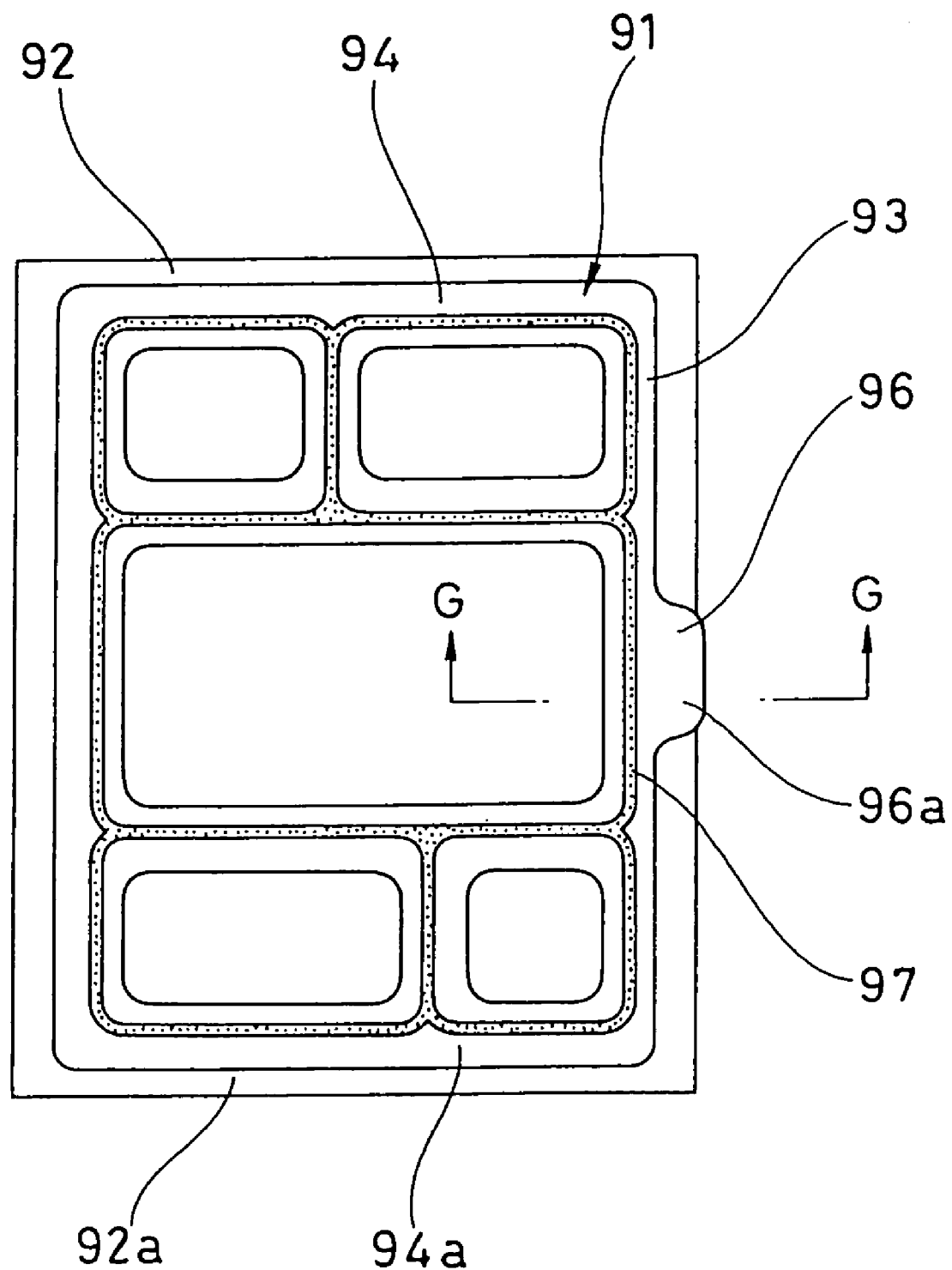
FIG. 29 is a plan view showing a state in which a gasket in accordance with an eighteenth embodiment of the present invention is attached.
Figure 30:
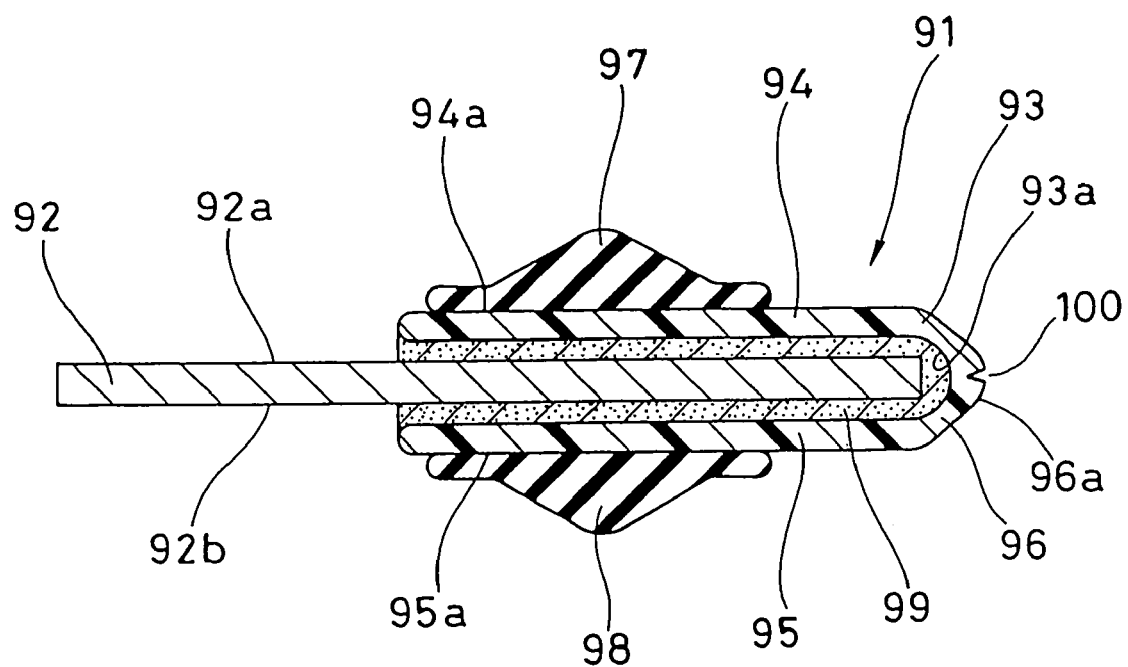
FIG. 30 is an enlarged cross sectional view along a line G-G in FIG. 29.
Figure 31:
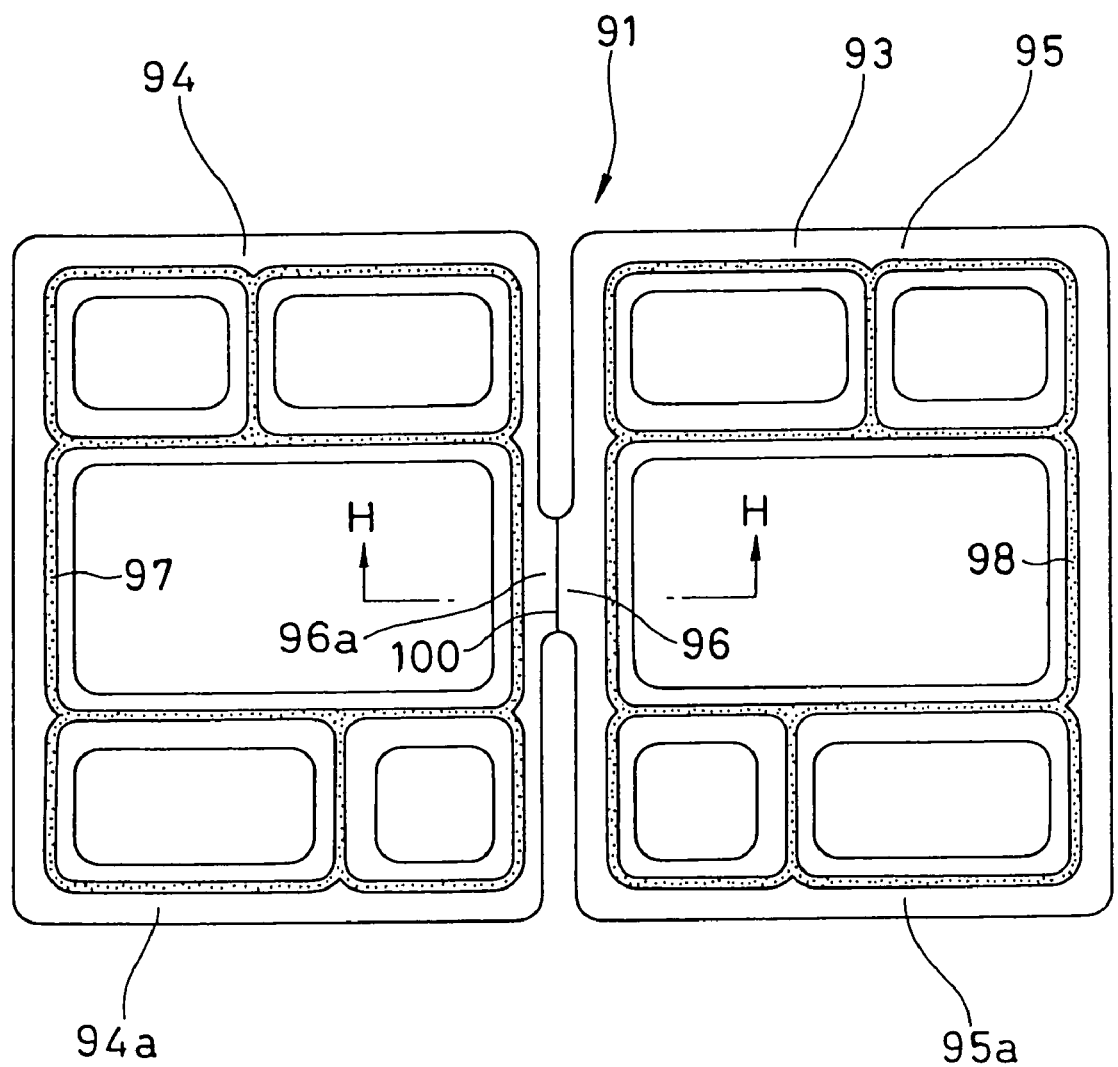
FIG. 31 is a plan view showing a state before the gasket is attached (before being bent)
Figure 32:
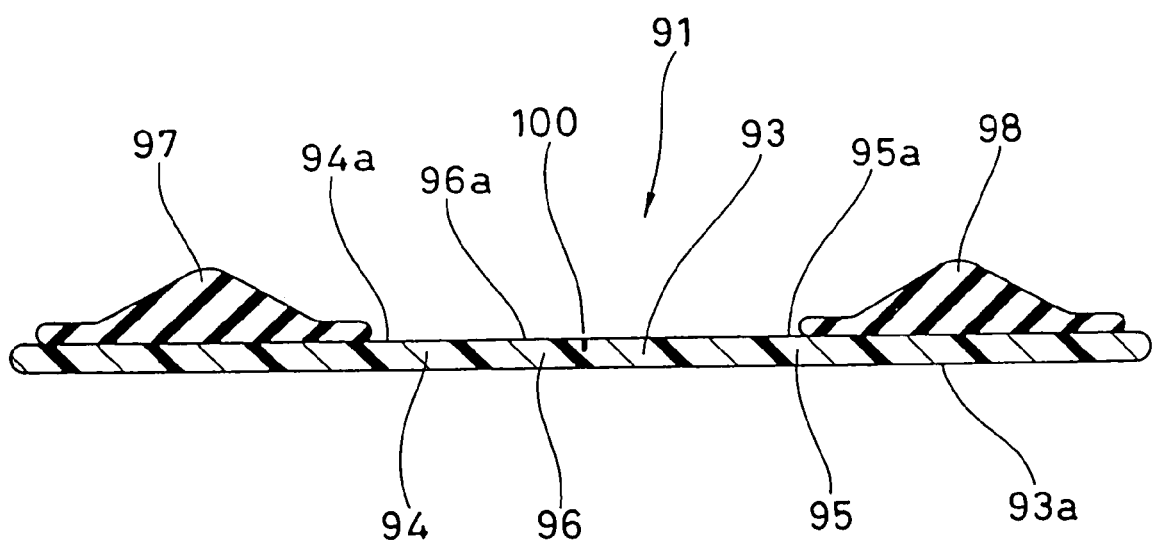
FIG. 32 is an enlarged cross sectional view along a line H-H in FIG. 31.
Figure 33:
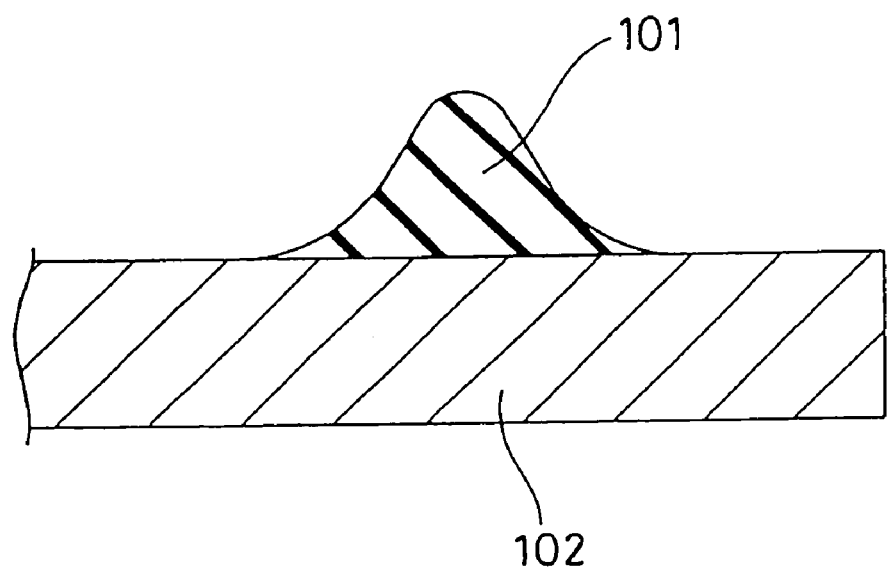
FIG. 33 is a cross sectional view of a main portion of a gasket in accordance with a conventional embodiment.
Figure 34:
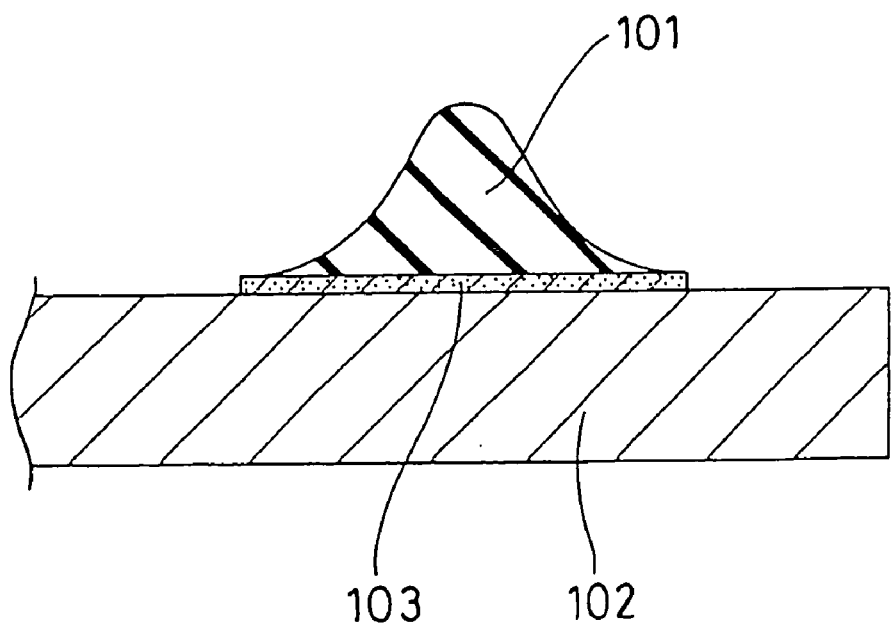
FIG. 34 is a cross sectional view of a main portion of a gasket in accordance with another conventional embodiment.
Figure 35:
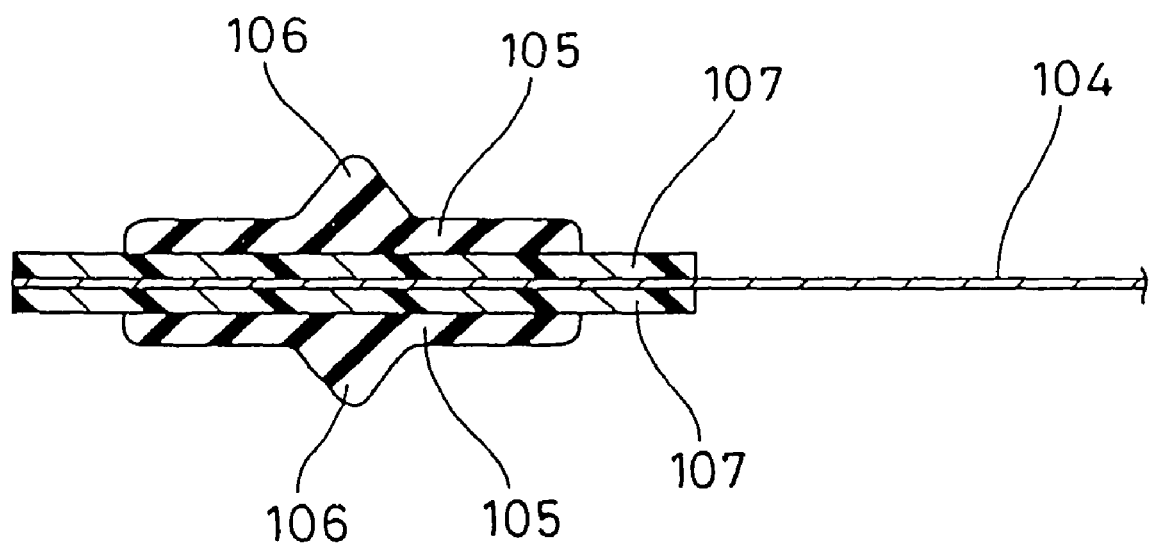
FIG. 35 is a cross sectional view of a main portion of a gasket in accordance with a comparative embodiment.

FIG. 29 shows a plan view of a state that a gasket 91 in accordance with an eighteenth embodiment of the present invention is mounted to an electrolyte membrane 92 corresponding to the other end mounting member, and an enlarged cross section (a cut end face) along a line G-G of the gasket is shown in FIG. 30. This gasket 91 is used as a gasket for a fuel battery, and is structured as follows.

That is, first, the gasket is provided with a resin film 93 corresponding to the sheet-shaped gasket mounting member, the resin film 93 is integrally provided with a portion (called also as one face side portion) 94 arranged in the side of one face 92a of the electrolyte membrane 92, a portion (called also as another face side portion) 95 arranged in the side of another face 92b, and a connection portion 96 connecting both the portions 94 and 95 and having a comparatively narrow width, and gasket main bodies 96 and 97 made of a rubber elastic material are integrally formed on an upper face 94a in the drawing of the one face side portion 94 and a lower face 95a in the drawing of the another face side portion 95 via an adhesive agent (not shown), respectively.

The gasket 91 integrally provided with the resin film 93 and the gasket main bodies 96 and 97 is structured such that the one face side portion 94, the another face side portion 95 and the connection portion 96 of the resin film 93 are formed as one sheet in plane shape, and the gasket main bodies 96 and 97 are integrally formed by injection molding on one face 94a and one face 95a in the same side of the one face side portion 94 and the another face side portion 95, respectively. The gasket is bent in two in the connection portion 96 at a time of being mounted, and is bonded to both the faces 92a and 92b of the electrolyte membrane 92 via an adhesive agent (an adhesive compound) 99 applied to another face 93a of the resin film 93.

A bending position specifying portion 100 constituted by a slit is provided in the connection portion 96 of the resin film 93 all around an entire width in the side of one face 96a so as to make the connection portion 96 easy to be bent.

At a time of manufacturing the gasket 91 having the structure mentioned above, an injection molding is carried out in a state in which the resin film 93 in which the adhesive agent is previously applied to one face 94a and one face 95a is attached to a molding die for injection molding the gasket main bodies 97 and 98 in a state of being attached in a plane shape, and the gasket main bodies 97 and 98 are bonded to one face 94a and one face 95a of the resin film 93 at the same time of the molding (an insert molding). Next, an integrally formed product constituted by the resin film 93 and the gasket main bodies 97 and 98 is taken out from the molding die, the adhesive agent 99 is applied to another face 93a of the resin film 93, and the integrally formed product is bonded to both the faces 92a and 92b of the electrolyte membrane 92 by the adhesive agent 99. The electrolyte membrane 92 may be replaced by the separator or the like.

In accordance with the gasket 91 having the structure mentioned above, the following operations and effects can be achieved.

That is, first, the integrally formed product of the gasket constituted by the resin film 93 and the gasket main bodies 97 and 98 is manufactured on the basis of the structure mentioned above, and in this integrally formed product, the resin film 93 serves as a reinforcing member with respect to the gasket main bodies 97 and 98. Accordingly, since a shape retaining property of the gasket 91 is improved in comparison with the product constituted by a rubber elementary substance, and the gasket 91 is hard to be deformed as a whole, it is possible to improve a handling property or assembling workability of the gasket 61.

Further, since the gasket main bodies 97 and 98 are integrally formed with the resin film 93 and are later bonded to the electrolyte membrane 92 via the resin film 93, it is not necessary to attach the electrolyte membrane 92 to the molding die at a time of molding the gasket main bodies 97 and 98. Accordingly, since there is no risk that a crack or the like is generated even in the case that the electrolyte membrane 92 is made of a material having low strength or a thin plate, it is possible to easily integrate the electrolyte membrane 92 with the gasket 91.

Further, since the resin film 93 attached to the molding die in place of the electrolyte membrane 92 has no fear that the crack or the like is generated, it is possible to set a mold clamping force large at a time of molding. Accordingly, it is possible to prevent a lot of rubber burrs from being generated at a time of molding.

Further, since the structure is made such that the gasket 91 is mounted to the electrolyte membrane 92 corresponding to the other end mounting member in accordance with a sticking function achieved by the adhesive agent 99 provided on another face 93a of the resin film 93, the gasket 91 can be mounted to the electrolyte membrane 92 in accordance with a simple work only of bending, positioning and pressing the gasket 91.

Still further, since the gasket is provided with the gasket main bodies 97 and 98 for both faces arranged on both the faces 92a and 92b of the electrolyte membrane 92 corresponding to the other end mounting member, and the resin film 93 integrated with the gasket main bodies 97 and 98 for both faces, and the gasket 91 is structured such as to be bent in two at a time of being mounted to the electrolyte membrane 92 so as to be bonded to both the faces 92a and 92b of the electrolyte membrane 92, it is possible to manufacture and handle originally two gaskets required on both the faces 92a and 92b of the electrolyte membrane 92 in a state of combining into one piece. Accordingly, it is possible to widely reduce a number of man-hour and a cost for manufacturing.

In this case, in the embodiment mentioned above, the gasket main bodies 97 and 98 may be formed in accordance with a dispenser method, a printing method or the like in place of the injection molding method, and the adhesive rubber may be integrally formed directly without applying the adhesive agent in place of integrally forming the gasket main bodies 97 and 98 on one face 94a and one face 95a of the resin film 93 via the adhesive agent, as mentioned above. Further, the gasket main bodies 97 and 98 which are previously formed in the product shape independently may be bonded to one face 94a and one face 95a of the resin film 93 by the adhesive agent.

EFFECT OF THE INVENTION AND INDUSTRIAL APPLICABILITY

The present invention achieves the following effects.

That is, first, in the gasket in accordance with the first aspect of the present invention provided with the structure mentioned above, since the integrated product constituted by the sheet-shaped gasket mounting member provided with the sticking function on one face and the gasket main body made of the rubber-type elastic material is formed, the sheet-shaped gasket mounting member serves as an effect of reinforcing the gasket main body, so that it is possible to restrict the deformation of the whole of the gasket comparatively small at a time of handling. Accordingly, it is possible to improve a handling property or assembling workability of the gasket. Further, since the gasket main body is integrated with the sheet-shaped gasket mounting member and is bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. Further, since the structure is made such that the gasket is mounted to the other end mounting member on the basis of the sticking function provided on one face of the sheet-shaped gasket mounting member, it is possible to mount the gasket to the other end mounting member in accordance with a simple work of only positioning and pressing the gasket. The other end mounting member is, for example, the separator for the fuel battery (the fourteenth aspect), and the reaction electrode portion for the fuel battery or the electrolyte membrane as the component part thereof (the fifteenth aspect) or the top cover for an HDD (the sixteenth aspect) the operations and effects mentioned above can be obtained with respect to an exclusive gasket used for each of them.

Further, in the gasket in accordance with the second aspect of the present invention provided with the structure mentioned above, since the gasket main body is integrally formed on another face (the opposite face to one face provided with the sticking function) of the sheet-shaped gasket mounting member by using the adhesive agent, the sheet-shaped gasket mounting member also serves as the effect of reinforcing the gasket main body, so that it is possible to restrict the deformation of the whole of the gasket comparatively small at a time of handling. Accordingly, it is possible to improve a handling property or assembling workability of the gasket. Further, since the gasket main body is integrated with the sheet-shaped gasket mounting member and is bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is the material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated.

Further, in the gasket in accordance with the third aspect of the present invention provided with the structure mentioned above, since the main body is made of the adhesive rubber and is integrally formed on another face of the sheet-shaped gasket mounting member by using the adhesive property of the adhesive rubber, the sheet-shaped gasket mounting member also serves as the effect of reinforcing the gasket main body, so that it is possible to restrict the deformation of the whole of the gasket comparatively small at a time of handling. Accordingly, it is possible to improve a handling property or assembling workability of the gasket. Further, since the gasket main body is integrated with the sheet-shaped gasket mounting member and is bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated.

Further, in the gasket in accordance with the fourth aspect of the present invention provided with the structure mentioned above, since the gasket main body is integrally formed on both faces of the end portion of the sheet-shaped gasket mounting member by using the adhesive agent, the sheet-shaped gasket mounting member also serves as the effect of reinforcing the gasket main body, so that it is possible to restrict the deformation of the whole of the gasket comparatively small at a time of handling. Accordingly, it is possible to improve a handling property and assembling workability of the gasket. Further, since the gasket main body is integrated with the sheet-shaped gasket mounting member and is bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. Further, since the gasket main body is integrally formed on both faces of the end portion of the sheet-shaped gasket mounting member, the both-face gasket is formed, and the gasket main body is in direct contact with the other end mounting member, so that it is possible to securely seal between the gasket and the other end mounting member.

Further, in the gasket in accordance with the fifth aspect of the present invention provided with the structure mentioned above, since the main body is made of the adhesive rubber and is integrally formed on both faces of the end portion of the sheet-shaped gasket mounting member by using the adhesive property of the adhesive rubber, the sheet-shaped gasket mounting member also serves as the effect of reinforcing the gasket main body, so that it is possible to restrict the deformation of the whole of the gasket comparatively small at a time of handling. Accordingly, it is possible to improve a handling property or assembling workability of the gasket. Further, since the gasket main body is integrated with the sheet-shaped gasket mounting member and is bonded to the other end mounting member via the sheet-shaped gasket mounting member, it is not necessary to attach the other end mounting member to the molding die at a time of molding the gasket main body. Accordingly, since there is no risk that any crack or the like is generated even in the case that the other end mounting member is a material having low strength or a thin plate, it is possible to easily integrate the other end mounting member with the gasket. Further, in the case that the sheet-shaped gasket mounting member attached to the molding die in place of the other end mounting member is, for example, a resin film, since there is no risk that the crack or the like is generated in this sheet-shaped gasket mounting member, it is possible to set the mold clamping force large, so that it is possible to inhibit a lot of molding burrs from being generated. Further, since the gasket main body is integrally formed on both faces of the end portion of the sheet-shaped gasket mounting member, the both-face gasket is formed, and the gasket main body is in direct contact with the other end mounting member, so that it is possible to securely seal between the gasket and the other end mounting member.

Further, in the gasket in accordance with the sixth aspect of the present invention provided with the structure mentioned above, since the adhesive agent is attached to one face of the sheet-shaped gasket mounting member and the mold releasing film is releasably attached to the one face, it is possible to protect the adhesive agent by the mold releasing film before the mounting work of the gasket, and it is possible to mount the gasket to the other end mounting member in accordance with a simple work only of peeling the mold releasing film and positioning and pressing the gasket, at a time of the mounting work.

Further, in the gasket in accordance with the seventh aspect of the present invention provided with the structure mentioned above, since the adhesive agent is attached to one face of the sheet-shaped gasket mounting member and the mold releasing film is releasably attached to the one face, it is possible to protect the adhesive agent by the mold releasing film before the mounting work of the gasket, and it is possible to mount the gasket to the other end mounting member in accordance with a simple work only of peeling the mold releasing film and positioning and pressing the gasket, at a time of the mounting work. Further, since the portion peeling the mold releasing film at a time of the mounting work is provided in some parts on the periphery of the gasket, and the peeling area and the sticking area are set small, the sticking work is made extremely easy.

Further, in the gasket in accordance with the eighth aspect of the present invention provided with the structure mentioned above, since the integral product of the rubber-only gasket main body and the sheet-shaped gasket mounting member provided in some parts on the periphery of the gasket main body is formed, and the sheet-shaped gasket mounting member is provided with the sticking function on one face thereof, it is possible to mount the gasket to the other end mounting member in accordance with the simple work only of positioning and pressing the gasket, at a time of the mounting work of the gasket.

Further, in the gasket in accordance with the ninth aspect of the present invention provided with the structure mentioned above, since the cross sectional shape of the gasket main body in accordance with the eighth aspect is formed in an O-ring shape, the gasket main body is in direct contact with the other end mounting member, so that it is possible to effectively seal between the gasket and the other end mounting member. Accordingly, it is possible to obtain a high sealing property without depending on the material or the surface roughness of the other end mounting member, and it is possible to obtain a high sealing property even in the case that a small sealing effect is obtained only by the adhesive agent.

Further, in the gasket in accordance with the tenth aspect of the present invention provided with the structure mentioned above, since the cross sectional shape of the gasket main body in accordance with the eighth aspect is formed in the lip shape, the gasket main body is also in direct contact with the other end mounting member, so that it is possible to effectively seal between the gasket and the other end mounting member. Accordingly, it is possible to obtain a high sealing property without depending on the material or the surface roughness of the other end mounting member, and it is possible to obtain a high sealing property even in the case that a small sealing effect is obtained only by the adhesive agent.

Further, in the gasket in accordance with the eleventh aspect or the twelfth aspect of the present invention provided with the structure mentioned above, since the gasket is provided with the gasket main bodies for both faces arranged on both the faces of the other end mounting member, and the sheet-shaped gasket mounting member integrated with the gasket main bodies for both faces, and the gasket is structured such as to be bent in two at a time of being mounted to the other end mounting member so as to be stuck to both the faces of the other end mounting member, it is possible to manufacture and handle two gaskets required on both the faces of the other end mounting member in a state of combining two gaskets into one piece, so that it is possible to widely reduce a number of man-hour and a cost for manufacturing. In addition, to this, in accordance with the thirteenth aspect, since the connection portion of the sheet-shaped gasket mounting member is provided with the bending position specifying portion such as a slit, a perforated line or the like, it is possible to easily bend the connection portion at the specified portion.

Still further, in each of the gaskets in accordance with the seventeenth aspect to the twentieth aspect of the present invention provided with the structure mentioned above, the same operations and effects as those of the gasket in accordance with the first aspect mentioned above can be achieved. Further, in addition, it is possible to prevent the surface pressure peak value of the gasket main body from being lowered, even when the position at which the gasket is stuck on both the faces of the electrolyte membrane is slightly displaced.

What is claimed is:

1. A gasket assembly comprising:
   a sheet-shaped gasket mounting member having a three-layer structure including a resin film, an adhesive agent layer, and a mold releasing film; and
   a gasket main body made of a rubber elastic material and having a substantially C shape in cross section, said gasket main body being attached to said sheet-shaped gasket mounting member to cover an outer peripheral edge of said sheet-shaped gasket mounting member;
   said sheet-shaped gasket mounting member including two opposed faces and an end edge face located extending between said two opposed faces, said sheet-shaped gasket mounting member being provided on one face of said two opposed faces with said resin film and being provided on the other face of said two opposed faces with said mold releasing film, said adhesive agent layer being disposed between said resin film and said mold releasing film;
   said gasket main body being provided on a top face and a bottom face with a seal lip portion having a substantially triangular shape in cross section, said gasket main body being integrally formed on said outer peripheral edge of said sheet-shaped gasket mounting member by injection molding;
   a part of said sheet-shaped gasket mounting member being exposed at an inner peripheral edge of said sheet-shaped gasket mounting member;
   said gasket main body being mounted in a U-shaped gasket mounting groove of a separator for a fuel battery, said seal lip portion of said gasket main body provided on the bottom face of said gasket main body being brought into contact with a bottom face of said U-shaped gasket mounting groove, said U-shaped gasket mounting groove defining a recessed gasket attaching portion;
   a portion of said mold releasing film being removed to expose a part of said adhesive agent layer, said exposed portion of said adhesive agent layer being adhered to a part of said separator located adjacent to said gasket mounting groove and said inner peripheral edge of said resin film and said adhesive agent layer of said sheet-shaped gasket mounting member projecting over said part of said separator located adjacent to said gasket mounting groove and said seal lip portion on said bottom face of said gasket main body and a remaining portion of said mold releasing film of said sheet-shaped gasket mounting member being located in said recessed gasket attaching portion of said U-shaped gasket mounting groove.

2. The gasket assembly as claimed in claim 1, wherein the sheet-shaped gasket mounting member is a resin film of one of polyethylene terephthalate, polyethylene naphthalate, polyimide, ester, amide and imide.

* * * * *